United States Patent [19]
Kiyoshi

[11] Patent Number: 4,803,326
[45] Date of Patent: Feb. 7, 1989

[54] WIRE-CUT ELECTRIC DISCHARGE MACHINE IN WHICH TWO ADJOINING SEGMENTS OF A COMMON ELECTRODE EFFECT MACHINING

[75] Inventor: Inoue Kiyoshi, Tokyo, Japan
[73] Assignee: Inoue Japax Research Incorporated, Tokyo, Japan
[21] Appl. No.: 919,005
[22] PCT Filed: Jan. 17, 1986
[86] PCT No.: PCT/JP86/00019
§ 371 Date: Sep. 17, 1986
§ 102(e) Date: Sep. 17, 1986
[87] PCT Pub. No.: WO86/04280
PCT Pub. Date: Jul. 31, 1986

[30] Foreign Application Priority Data

Jan. 17, 1985 [JP] Japan .................................. 60-05056
Jan. 18, 1985 [JP] Japan .................................. 60-05943
Feb. 8, 1985 [JP] Japan .................................. 60-21793
Mar. 29, 1985 [JP] Japan .................................. 60-63241
Apr. 11, 1985 [JP] Japan .................................. 60-75361
Apr. 16, 1985 [JP] Japan .................................. 60-79400

[51] Int. Cl.⁴ .......................... B23H 7/02; B23H 7/10
[52] U.S. Cl. .................................. 219/69 W; 204/206
[58] Field of Search ............. 219/69 W, 69 M, 69 R, 219/69 E, 69 V; 204/206, 224 M

[56] References Cited

U.S. PATENT DOCUMENTS

| | | | |
|---|---|---|---|
| 4,386,248 | 5/1983 | Inoue | 219/69 W |
| 4,420,671 | 12/1983 | Bonga | 219/69 W |
| 4,438,312 | 1/1984 | Inoue | 219/69 W |
| 4,649,252 | 3/1987 | Obara | 219/69 W |
| 4,739,143 | 4/1988 | Sakai et al. | 219/69 W |

FOREIGN PATENT DOCUMENTS

| | | | |
|---|---|---|---|
| 255316 | 12/1985 | Japan | 219/69 W |
| 315557 | 11/1971 | U.S.S.R. | 219/69 W |

Primary Examiner—A. D. Pellinen
Assistant Examiner—Geoffrey S. Evans
Attorney, Agent, or Firm—Roberts, Spiecens & Cohen

[57] ABSTRACT

An apparatus in which a wire electrode is pulled off a supply reel, passes through a predetermined path, is led to the machining portion of a work piece to cut the work piece, there-after, the wire electrode is turned back, is returned along the path it has come to the machining portion of the work piece, and is used again to work the same work piece. At least one of these two segments of the wire electrode is advanced in a zig-zag path along the machining line when the work piece is cut, thereby allowing the working gap to be widened for improving the efficiency and accuracy of machining.

20 Claims, 15 Drawing Sheets

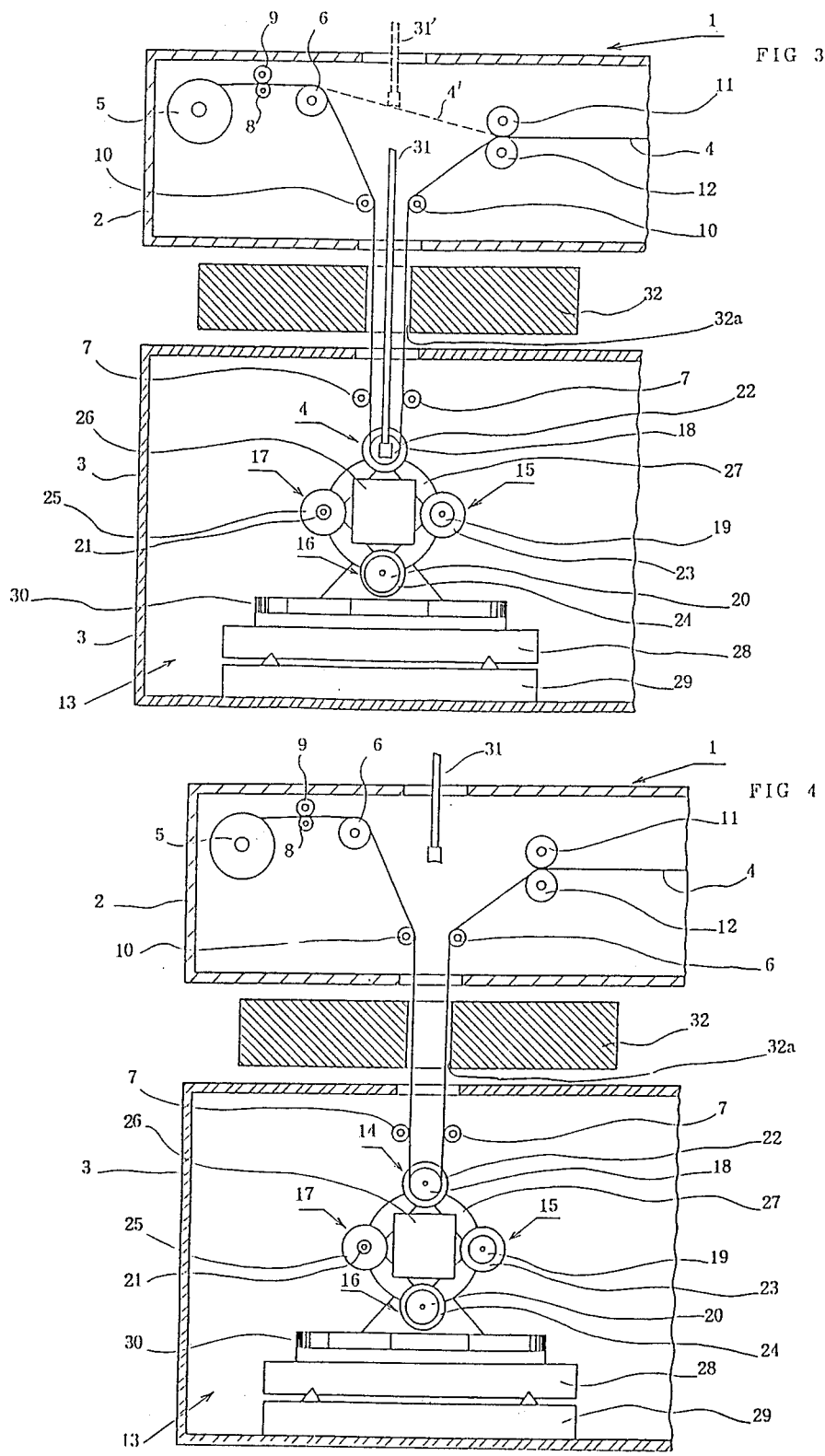

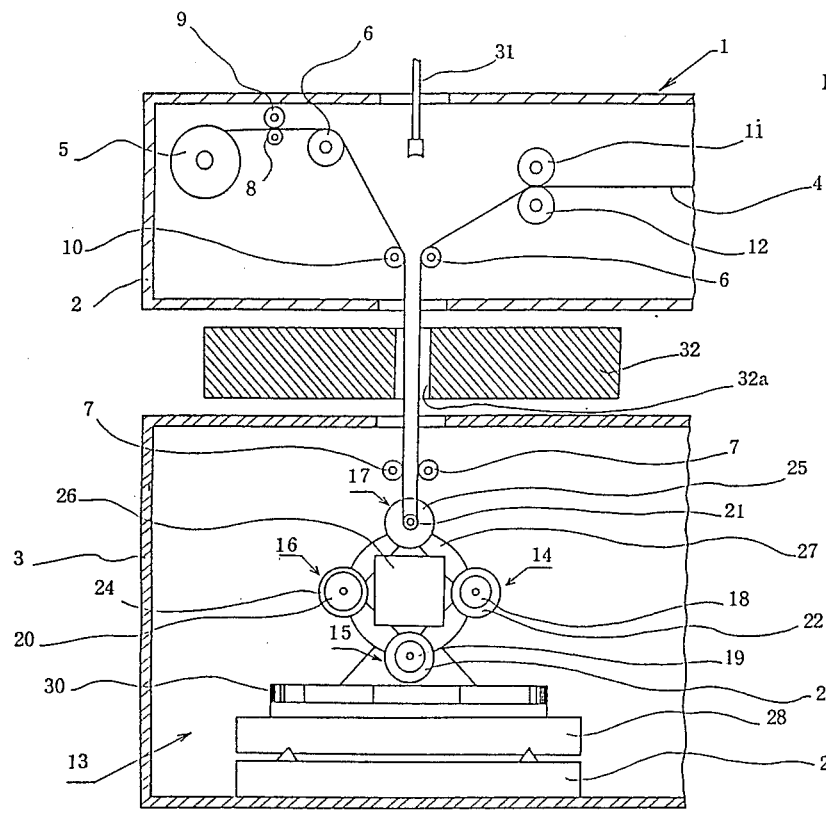
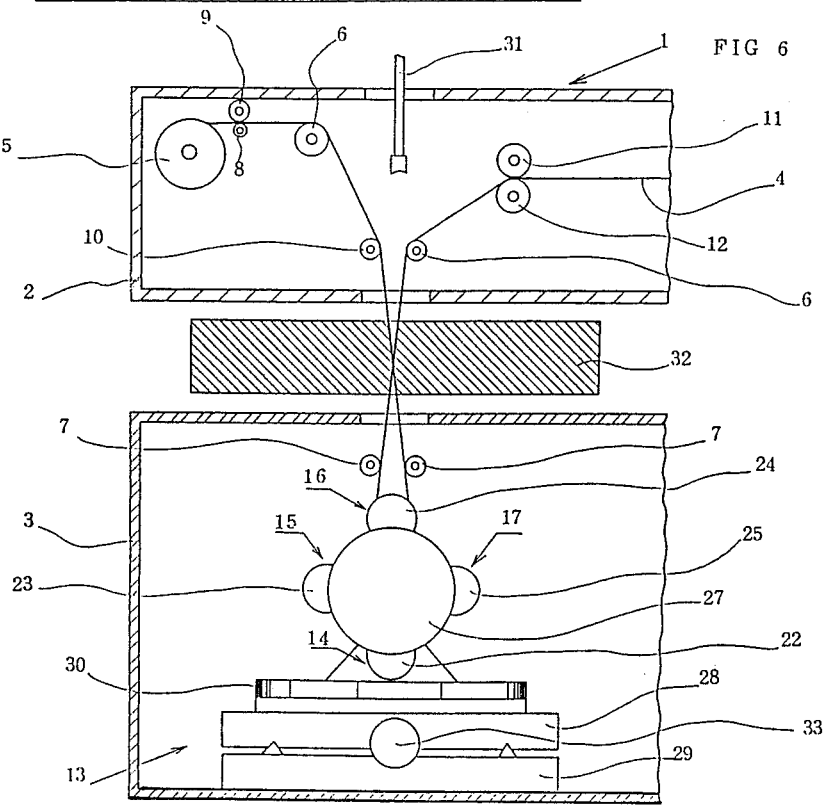
FIG 5
FIG 6

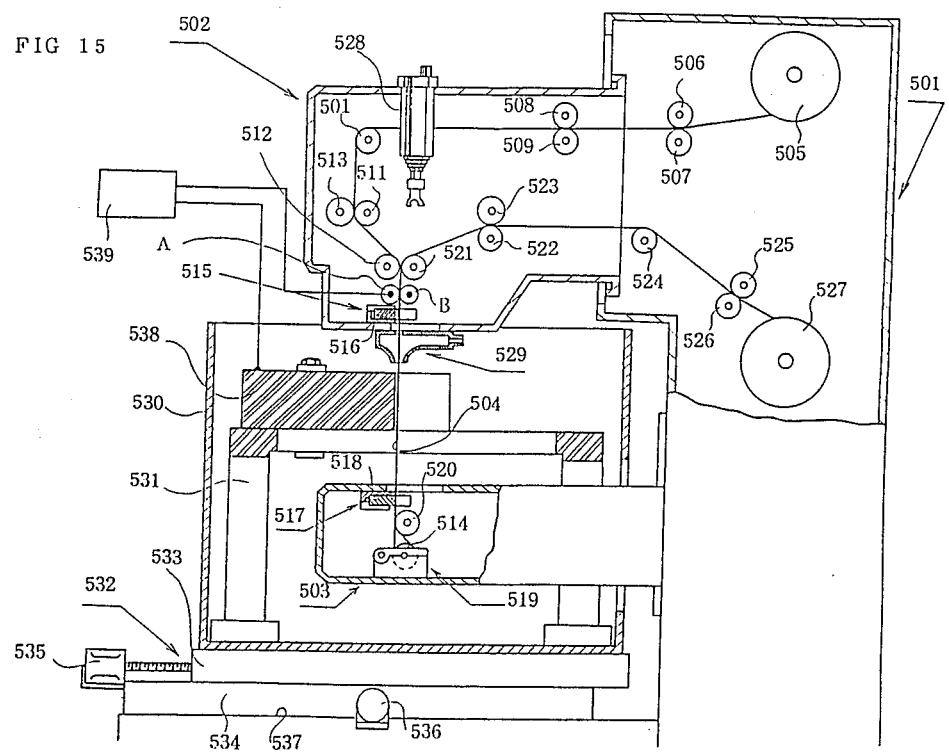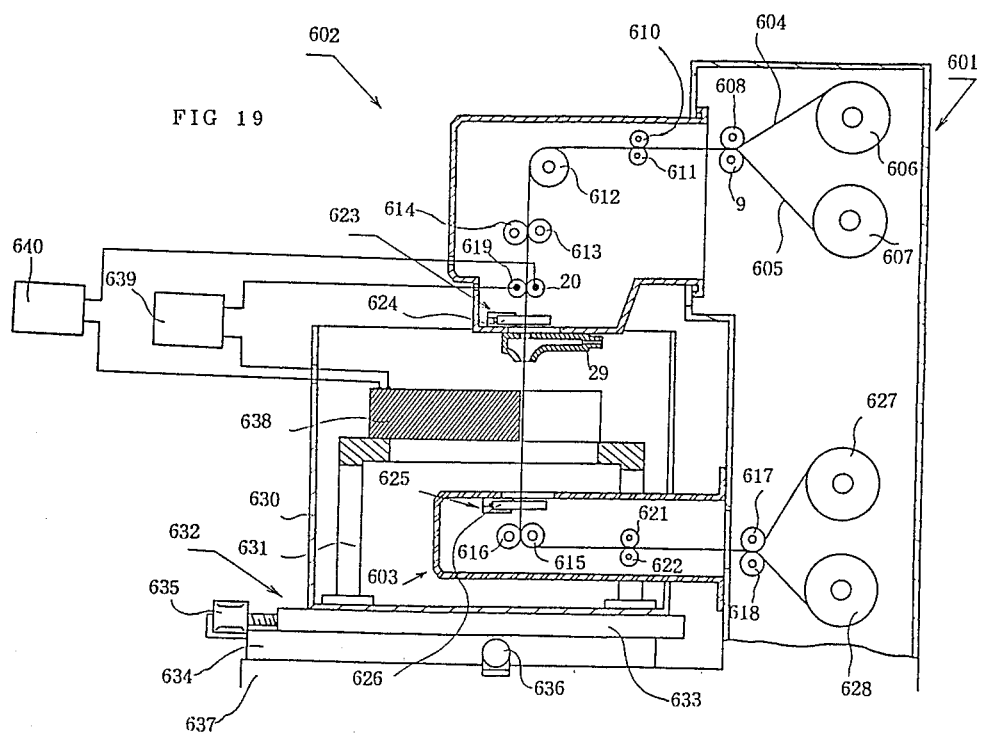

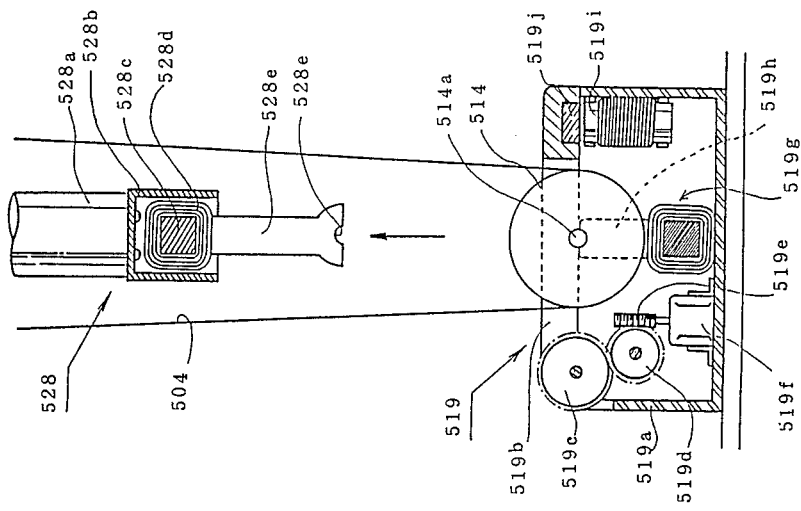
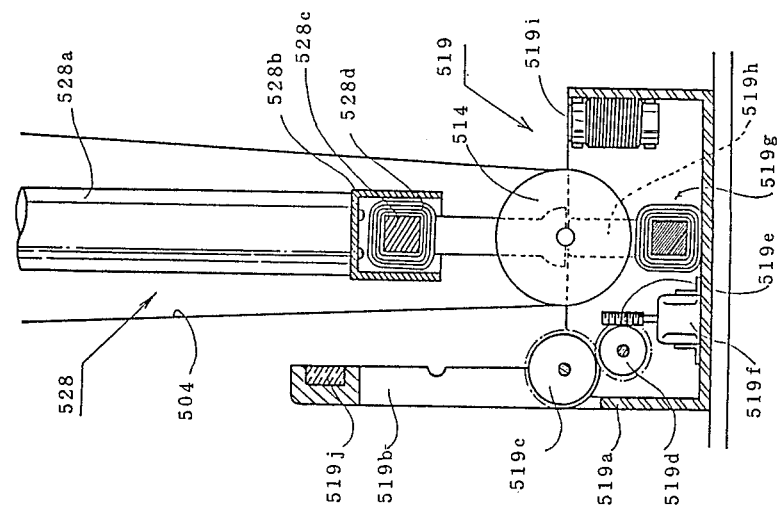
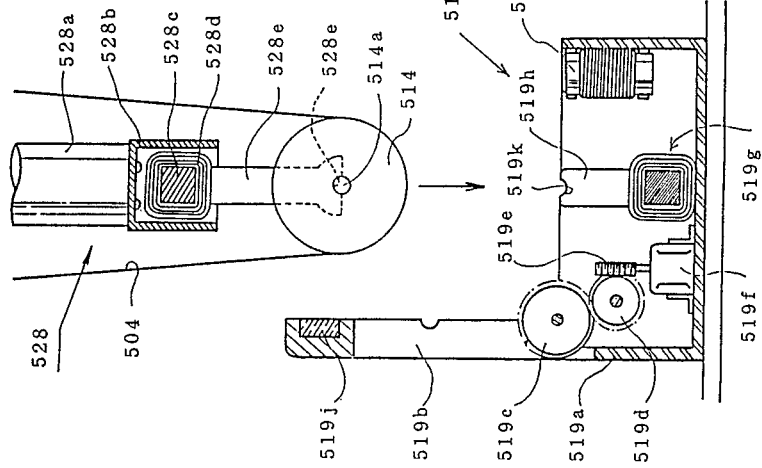

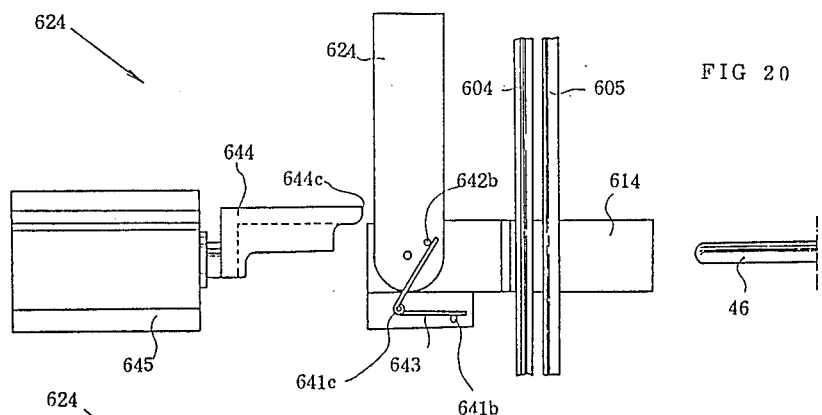
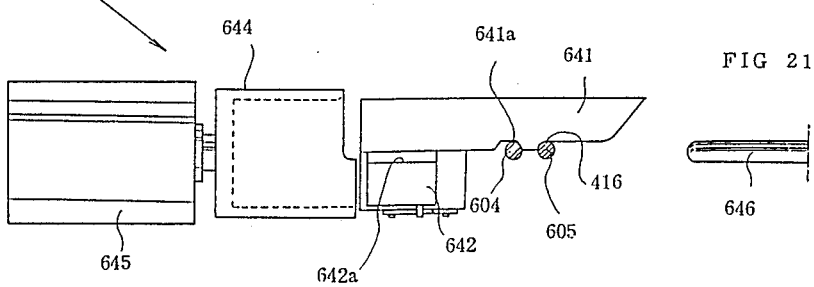
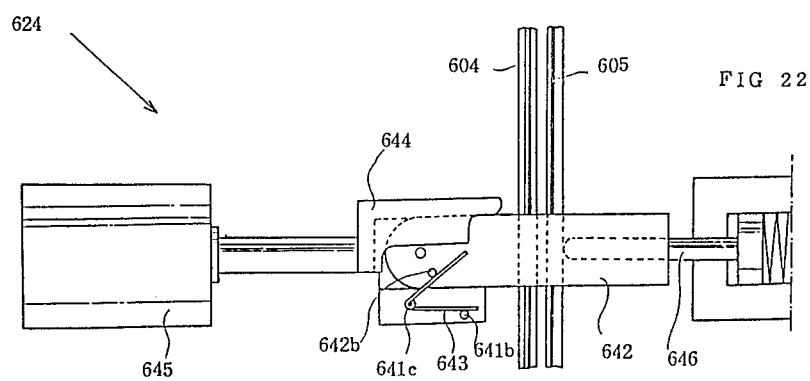
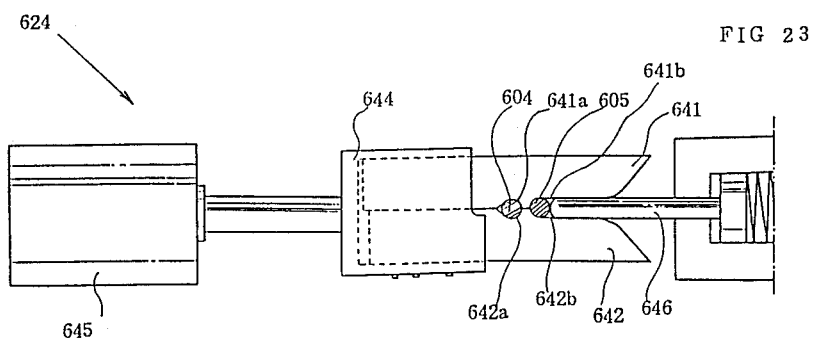

WIRE-CUT ELECTRIC DISCHARGE MACHINE IN WHICH TWO ADJOINING SEGMENTS OF A COMMON ELECTRODE EFFECT MACHINING

TECHNICAL FIELD

The present invention relates to a wire-cut electric discharge machine and, more particularly, to a wire-cut electric discharge machine of the type in which: a wire electrode is pulled out from a supply reel, passes through a predetermined path, is used for machining a work piece, and is collected by a collecting apparatus; this wire electrode passes trhough a working portion of the work piece and thereafter, it is turned back, is returned along the path it had come through, passes again through the working portion of the work piece, and is collected and scrapped; and the single work piece is simultaneously worked by these doubled and reciprocating segments of the wire wire electrodes.

BACKGROUND ART

In conventional well-known wire-cut electric discharge machines, the wire electrode which has been used once for machining is scrapped without being used again.

The wire electrode is pulled out of the supply drum, passes through various kinds of guide rollers and the like, is led to the machining portion of the work piece, passes through the working zone, and is collected by the electrode collecting apparatus.

To determine the working zone, a pair of dies adapted to position the electrode and other guide members are ordinarily respectively attached to the tip portions of a pair of arms which extend from the column so as to locate the working zone therebetween.

Figure 1:
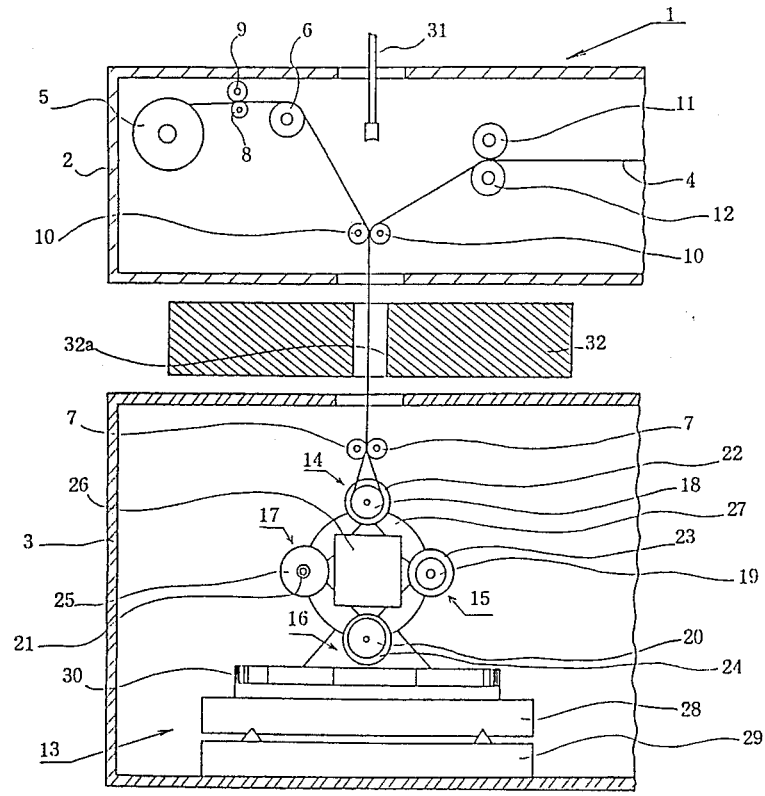
FIG. 1 is a cross sectional view showing operative states of the main parts of an embodiment of the present invention.

In this working portion, the wire electrode is rectilinearly suspended between the guide members by the action of a predetermined tension, is allowed to face the working portion of the work piece with a predetermined working gap held, and is fed in the direction of the central axis of the wire electrode itself. The electrode which has passed through the working place and has been used is wound around the electrode collecting drum, or cut and collected and scrapped.

Therefore, there is a problem such that the wire electrode is scrapped in spite of the fact that it may be still used again.

On the other hand, in conventional well-known wire-cut electric discharge machines, only one wire electrode exists in the working portion to be allowed to face the work piece, and the half peripheral surface on the side of the work advancing direction of this single wire electrode faces the working surface of the work piece and the machining is performed.

Since those opposite surfaces are the cylindrical surfaces, the gap therebetween is narrow and it is very difficult to supply enough working fluid into the gap. A sufficient cooling effect is not obtained, therefore, high-speed machining using the current pulse of a high energy cannot be performed. There is the problem such that the working efficiency is insufficient.

In addition, since the working gap is narrow, it takes a certain time for dropping the pressure which is caused by the discharge which is generated in this gap. Thus, the wire electrode is bent like an arch on the side opposite to the machining direction due to the influence of the residual pressure, so that there is the problem such that the machining accuracy deteriorates in an acute-angle portion, arc portion of small radii, and the like of the machining line.

Further, a number of discharge craters are produced in the outer peripheral surface of the wire electrode by the electric discharge and the outer peripheral surface becomes rough. Therefore, in the case of a thick work piece, in particular, there is also the problem that a smooth worked surface cannot be obtained.

Moreover, at the start of the machining, the wire electrode needs to be suspended among various kinds of guide rollers and to be inserted into the holes in the electrode positioning dies and the through holes which have previously been formed in the work piece, and the like.

These operations are very troublesome, since these operations need to be repeated whenever the wire electrode is cut during the machining or a plurality of parts are continuously cut out in a series.

DISCLOSURE OF THE INVENTION

The present invention seeks to solve the foregoing problems, and the first object is to form the working gap into a desired shape to supply the working fluid, thereby supplying enough working fluid into the working gap and improving the efficiency and accuracy of machining.

Another object of the invention is to provide a wire-cut electric discharge machine which can easily and automatically perform the suspending work of the wire electrode.

Still another object of the invention is to provide a novel wire-cut electric discharge machine by which cutting and finishing of the cut surface can be simultaneously performed by one process and the smooth finished surface can be obtained.

Still another object of the invention is to provide a novel wire-cut electric discharge machine which can form a complicated cut shape such as, for example, a zigzag line with sharp turns or the like by one process.

Still another object of the invention is to completely use the wire electrode without any waste and thereby to save the resources.

The gist of the present invention is as follows.

In the wire-cut electric discharge machine, a wire electrode which is pulled out of a supply reel, passes through a predetermined path, is used for machining a work piece, and is collected by a collecting apparatus, after travelling through the working portion of the work piece, is turned back and fed along the path it has come through, passes again through the working portion of the work piece, and thereafter the wire electrode is collected and scrapped; further, a single work piece can be simultaneously machined by these doubled and reciprocating wire electrodes.

In one embodiment of the invention, the wire electrode which is pulled out from a wire electrode reel, is used once for machining and thereafter, this electrode is turned back and guided in the opposite direction, passes again through the same working place, and is used for machining the work piece together with the segment of the wire electrode which is newly fed.

Therefore, in the wire-cut electric discharge machine according to the present invention, the electric discharge machining can be almost simultaneously and doubly performed in the same portion of the work piece by doubled and reciprocating segment of the wire electrode which pass through the common working place.

In this working place, the doubled and reciprocating segments of the wire electrode are fed in the opposite directions along their central axes. The wire electrodes may be come into contact with each other, cross-linked, or apart from each other, and when they are away from each other, they may be in parallel with each other or inclined.

In a typical embodiment of the invention, the doubled and reciprocating segments of the wire electrodes are used in closely contacting parallel relation with each other.

In this case, a relatively wider working gap as compared with the diameter of the wire electrode is formed between the doubled segments of the wire electrode and a work piece. Therefore, the working fluid can easily flow and a sufficiently large amount of working fluid is fed into the working gap. The cooling performance is enhanced, a thick plate can be easily worked, the high-efficient machining can be performed using a large current pulse, and the working efficiency is improved. On the other hand, the life time of the discharge pressure is remarkably reduced. Therefore, the bend of the electrode which is caused by the discharge pressure is reduced, the machining accuracy is improved, and the high-speed machining can be performed by a large machining current.

On the other hand, the doubled and reciprocating segments of the wire electrode which are in contact with each other are preferably controlled so as to be always arranged in the direction of the tangential or normal line of the scheduled machining line on the work piece. However, when occasion demands, they may be also arranged in a fixed direction irrespective of the machining direction.

It is desirable that between the doubled and reciprocating segments of the wire electrode, the segment which has already been used on the scheduled machining line, preceded the virgin electrode segment to be newly fed whereby the returning electrode segment performs cutting the work, and the cut surface is finished by the fresh wire electrode segment which is newly fed.

However, in another embodiment, the segments of the wire electrode may also be used for machining in the state in which they are cross-lined with or away from each other at a certain distance. In such a case, the positions of the segments of the electrode are separately and individually controlled and a complicated cut surface is given at once.

The tensions to be applied to the doubled segments of the wire electrode may be the same or may be respectively individually controlled.

As described above, in the case of performing the electric discharge machining by the doubled segments of the wire electrode which were turned back so as to reciprocate through the working position, the working gap is widened as compared with the case of the conventional wire-cut electric discharge machining which is performed a single wire electrode, the sufficient working gap is held, and the cooling effect is enhanced. Therefore, the high-efficient machining can be executed by the large current as mentioned above. However, it is difficult to arrange the doubled and reciprocating segments of the wire electrode in parallel and to stably supply a large current to the doubled segments of the wire electrode passing therethrough by the conventional well-known current supply pins or current supply rollers.

In order to arrange the doubled segments of the wire electrodes in parallel, to prevent that the run of the doubled wire electrodes is obstructed and that the surfaces of the electrode are damaged when they run and move in the path determined by those pins and rollers, to give as wide a contact area as possible to the segments of the wire electrode, and to supply a large current without causing overheating and the like, it is recommended to use a current supply apparatus as disclosed herewith which comprises a pair of conductive rollers which have two guide grooves having semi-circular cross sections to just receive or little less than the half sectional area of the wire electrode are formed in the outer peripheral surfaces in parallel with each other; a supporting mechanism for rotatably supporting the pair of rollers such that the two guide grooves face each other and can sandwich the wire electrode; and current supply brushes adapted to be electrically connected or come into contact with the pair of rollers.

It is also desirable that the supporting mechanism includes a spring mechanism for applying elastic forces to the rotary shafts of the rollers along the radial directions toward the points at which the rollers are come into contact with the wire electrodes. Further, it is preferable that the supporting mechanism includes a mechanism for supporting the pair of rollers so as to be freely come into contact with or removed from each other.

According to the invention, to remarkably reduce the time required for the whole machining by simultaneously performing the rough machining and the finishing work at the same time, one wire electrode segment is allowed to precede the other wire electrode segment on the scheduled cutting line, thereby allowing the rough cutting to be executed in conventional manner, at the same time, at least the other wire electrode segment is allowed to follow the preceding segment at a desired spacing thereby allowing the surface which was cut by the precedent wire electrode segment to be finished.

As mentioned above, there are the objects such that the doubled wire electrodes which were turned back so as to reciprocate through the working portion are rectilinearly suspended with a predetermined narrow gap with the work piece and these electrodes are positioned and the arranging direction is controlled. However, these objects cannot be attained by the electrode guides such as boat-shaped guides, die-type guides, and the like which are used in the conventional well-known wire-cut electric discharge machine, therefore, other electrode guides having some new shapes are necessary.

For this purpose, a novel wire electrode guide is provided to position the doubled wire electrode segments which are suspended in the working portion.

To accomplish the above objects, there is provided an electrode guide apparatus comprising: a pair of guide members which respectively are formed with notched portions adapted to hold the wire electrodes and which place the wire electrodes segments therebetween by allowing the surfaces having the notched portions to face each other; and a displacement mechanism for allowing at least one of the guide members to relatively move with respect to the other such that the surfaces formed with the notched portions come into contact with or are removed from each other.

The displacement mechanism of the guide members may be the mechanism for allowing at least one of the guide members to displace in the plane which is perpendicular to the feeding direction of the wire electrode, or may be the mechanism for allowing it to displace in the plane which is parallel with the feeding direction of the wire electrode.

On the other hand, it is desirable that the pair of guide members or the portions thereof which are to come into contact with the wire electrodes be made of a material such as diamond, ruby, ceramics, or the like having high hardness, wear resistance, and less surface friction with the wire electrode.

BRIEF DESCRIPTION OF DRAWINGS

Figure 2:
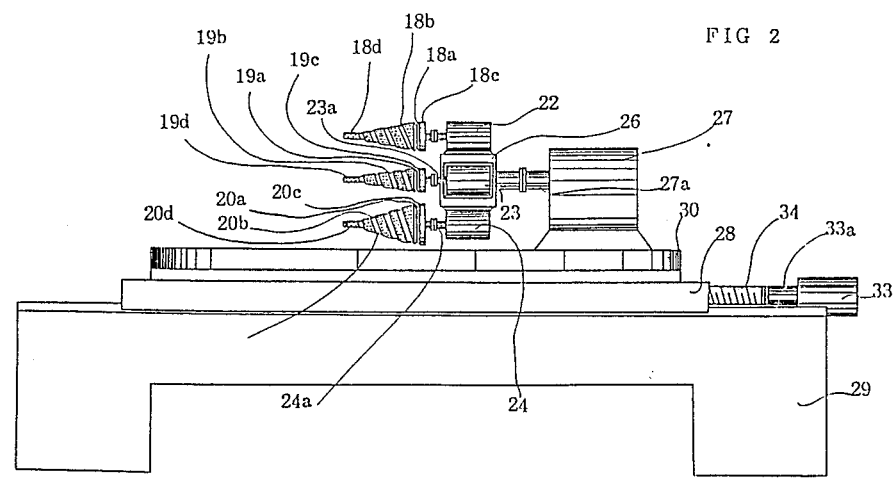
Figure 7:
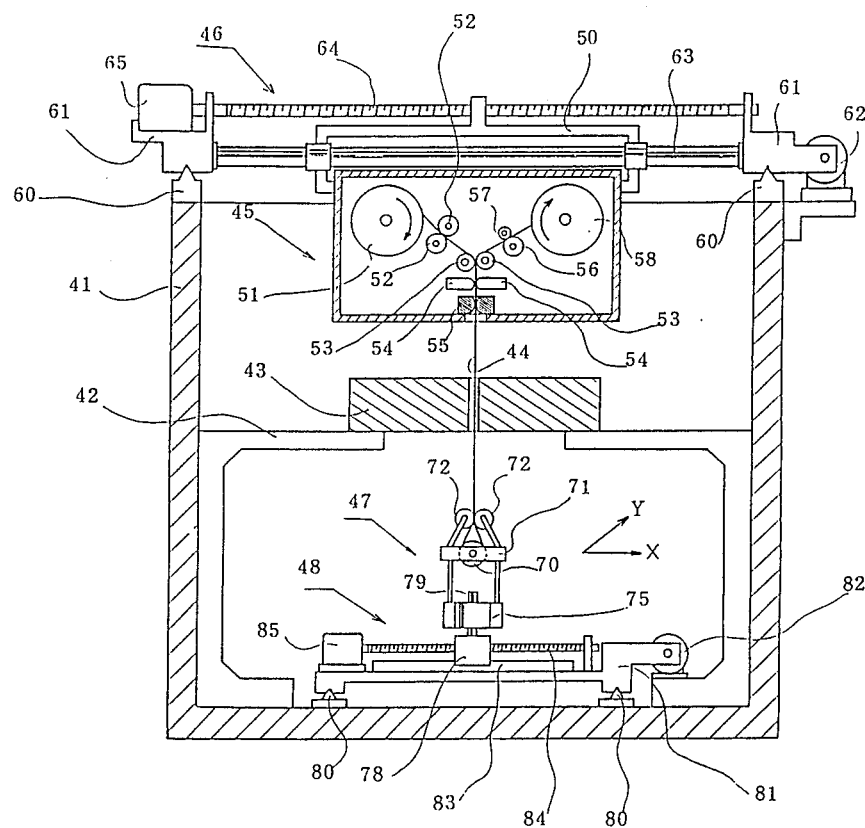
Figure 8:
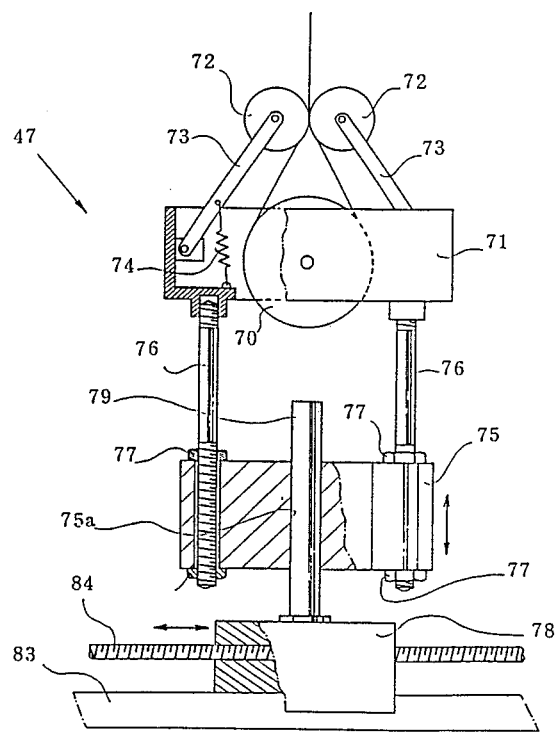
Figure 9:
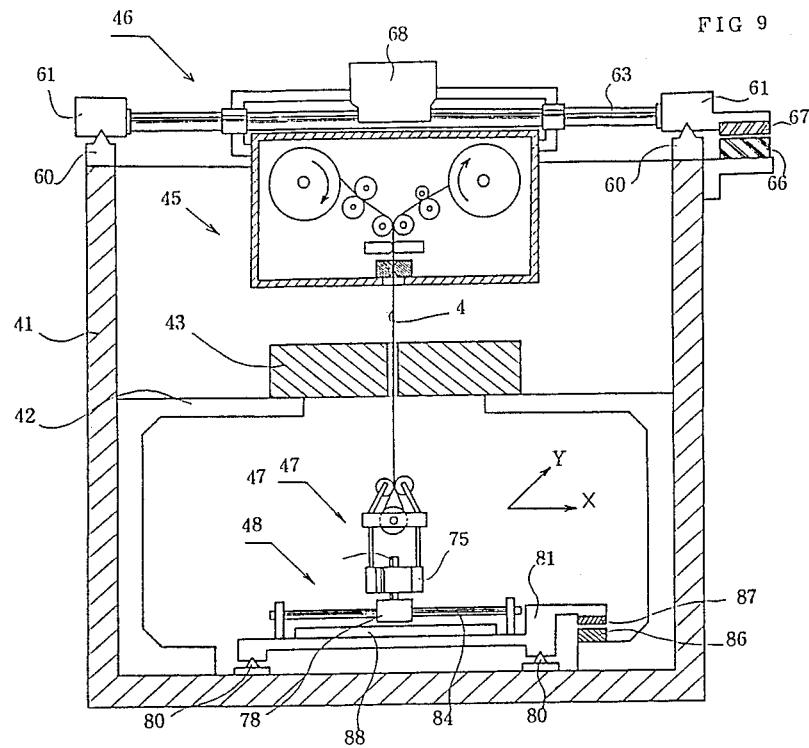
Figure 10:
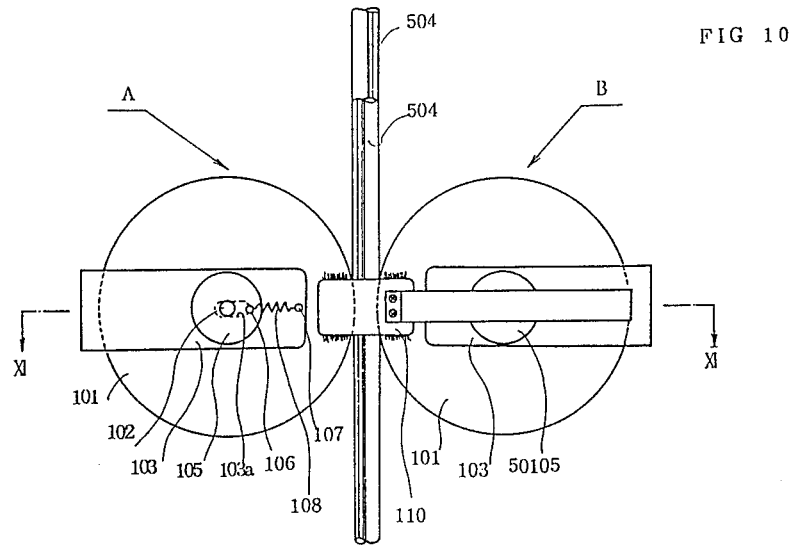
Figure 11:
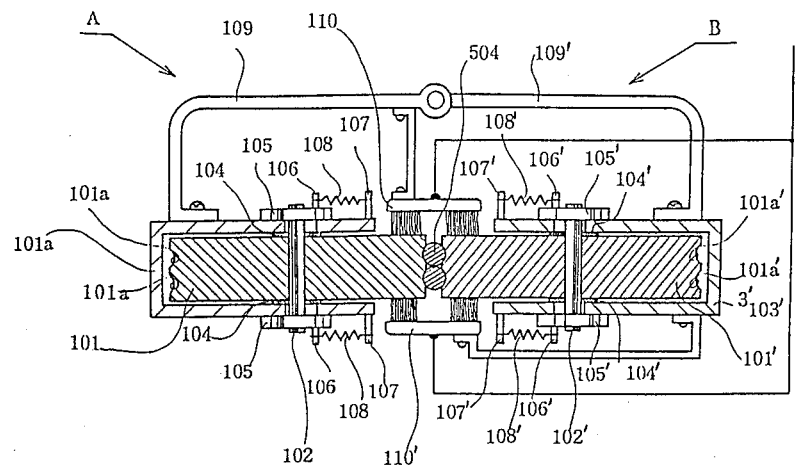
Figure 12:
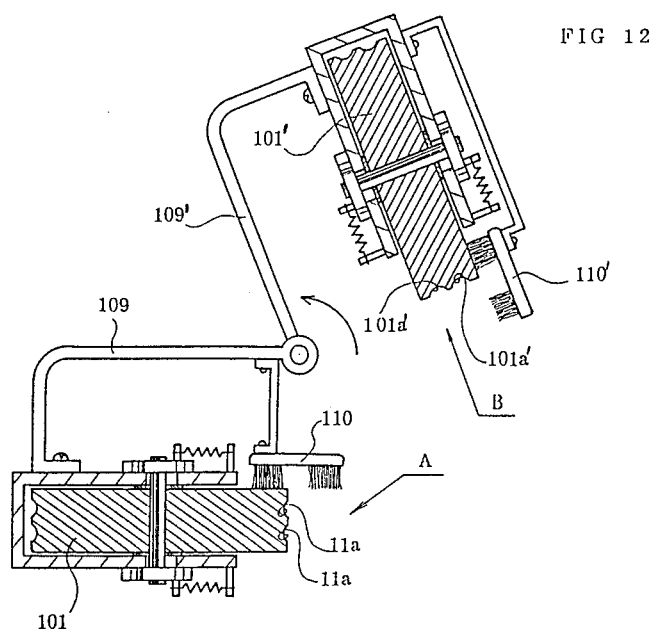
Figure 14:
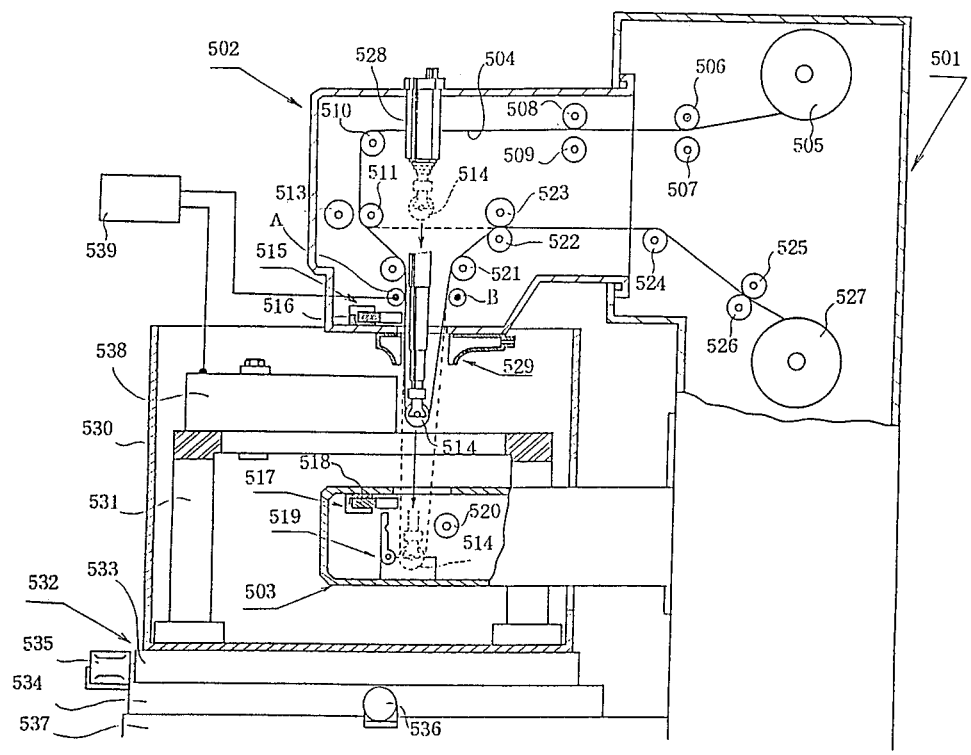
Figure 13:
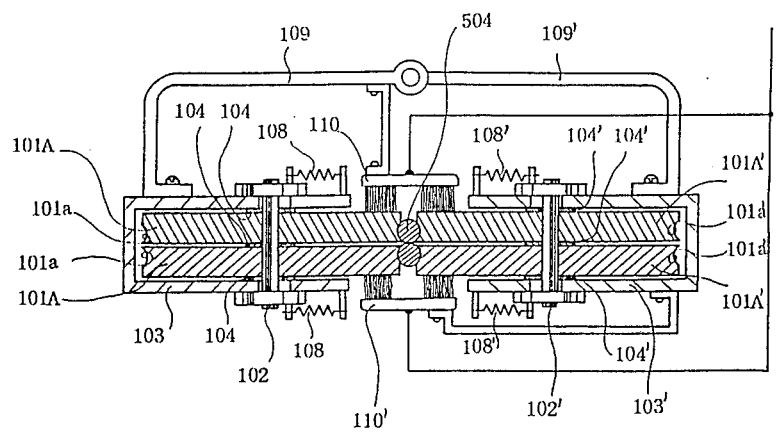
Figure 24:
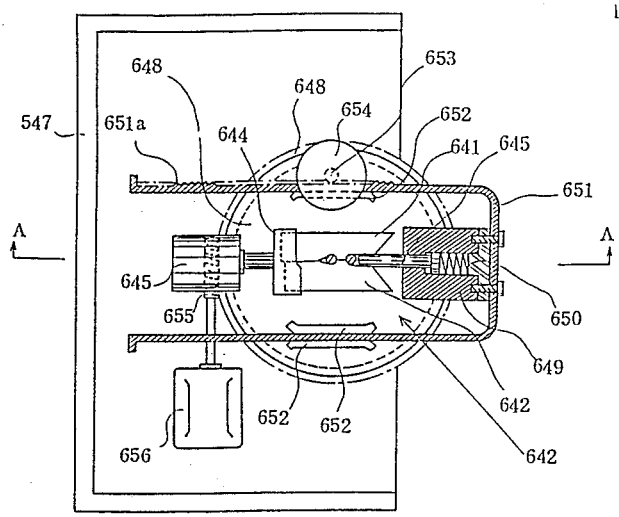
Figure 25:
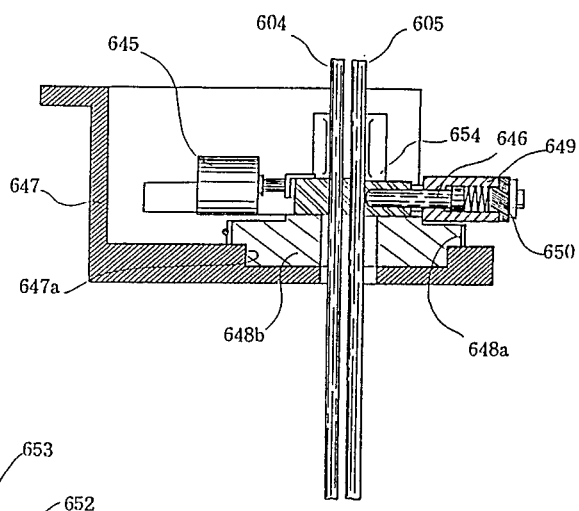
Figure 26:
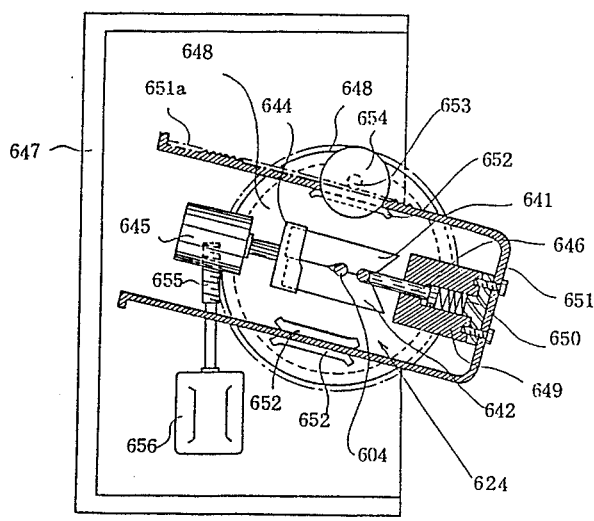
Figure 27:
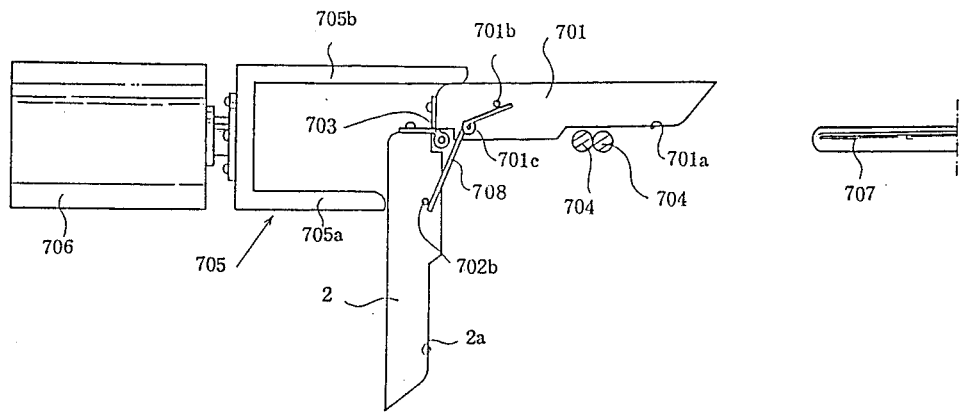
Figure 28:
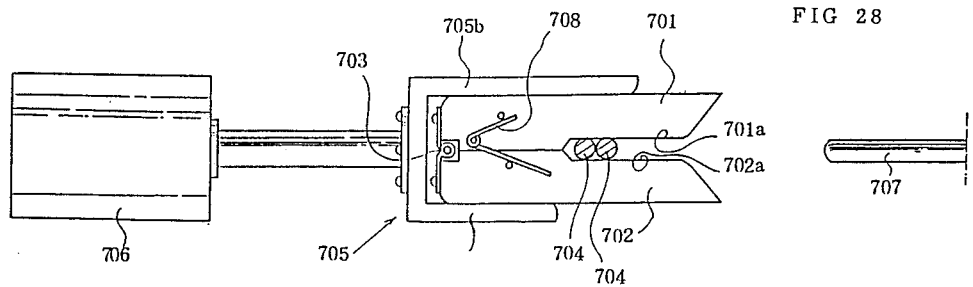
Figure 29:
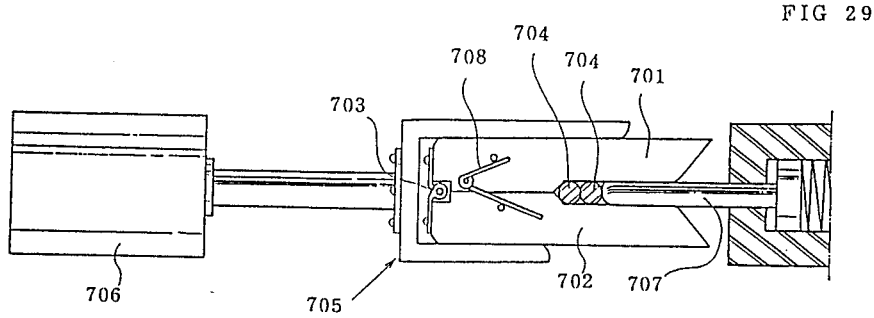

FIG. 1 is a cross sectional view showing operating states of the main part in an embodiment of the present invention;

FIG. 2 is an enlarged side elevational view of the portion of a wire electrode return apparatus which is used in the apparatus shown in FIG. 1;

FIG. 3 is a cross sectional view of the main part of the apparatus showing the step to set a wire electrode into the state shown in FIG. 1;

FIG. 4 is a diagram showing the step subsequent to the step shown in FIG. 3;

FIG. 5 is a cross sectional view showing another different method of using the foregoing apparatus;

FIG. 6; is a cross sectional view showing still another method of using the foregoing apparatus;

FIG. 7 is a cross sectional view showing an embodiment of a wire-cut electric discharge machine having a special tension control apparatus;

FIG. 8 is a side elevational view with a part cut away showing the details of construction of the wire electrode return portion;

FIG. 9 is a cross sectional view showing still another embodiment of a wire-cut electric discharge machine according to the invention;

FIG. 10 is a side elevational view showing an example of a current supply apparatus;

FIG. 11 is a cross sectional view of the foregoing current supply apparatus taken along the line XI—XI in FIG. 10;

FIG. 12 is a cross sectional view showing a state in which a pair of rollers of the current supply apparatus are separated from each other;

FIG. 13 is a cross sectional view showing another example of a current supply apparatus;

FIG. 14 and 15 are explanatory diagrams showing an embodiment and functions of an embodiment of a wire-cut electric discharge machine using another current supply apparatus different from the foregoing apparatus;

FIGS. 16 to 18 are enlarged side elevational views showing a structure and a use method of the current supply apparatus which are used in the wire-cut electric discharge machine shown in FIGS. 14 and 15;

FIG. 19 is an explanatory diagram showing an embodiment of a wire-cut electric discharge machine according to the invention;

FIG. 20 is a side elevational view showing construction of a wire electrode guide which is used in the wire-cut electric discharge machine shown in FIG. 19 and showing a state in which a pair of guide members are open;

FIG. 21 is a plan view thereof;

FIG. 22 is a side elevational view showing the wire electrode guide shown in the two preceding FIGS. and showing a state in which the setting work of the wire electrode has been completed;

FIG. 23 is a plan view thereof;

FIG. 24 is a plan view showing a state in which a wire electrode guide die shown in FIGS. 20 to 23 is used;

FIG. 25 is a cross sectional view taken along the line A—A in FIG. 24;

FIG. 26 is a plan view showing an operative state of the apparatus shown in FIG. 24;

FIG. 27 is a plan view showing the construction of another wire electrode guide different from the foregoing guide and showing a state in which a pair of guide members are open;

FIG. 28 is a plan view showing the wire electrode guide shown in FIG. 24 and showing a state in which the pair of guide members are closed;

FIG. 29 is a plan view showing a state in which the setting work of the wire electrode has been completed; and FIGS. 30 to 42 are explanatory diagrams showing working situations according to another working method, respectively.

An explanation will now be sequentially made hereinbelow.

BEST MODE FOR CARRYING OUT THE INVENTION

In FIGS. 1 to 6: reference numeral 1 denotes a main part of a wire-cut electric discharge machine according to the present invention in which one wire electrode is turned back to form doubled segments of a reciprocating electrode and the work is performed by said doubled and reciprocating wire electrodes;

2 is a first arm or working head having apparatuses for supplying and collecting the electrode; and 3 is a second arm or working head having an apparatus for returning the electrode and arranged so as to face the first arm 2.

These components are attached to a supporting mechanism disposed vertically on a bed of an electric discharge machine (not shown), or at the side portion thereof, or at other proper positions.

Numeral 4 denotes a wire electrode;

5 is a wire electrode supply reel arranged in the first arm or working head 2; 6 and 7 guide rollers; 8 a brake roller to apply a tension to the wire electrode; 9 a pinch roller; 10 current supply rollers; 11 a capstan to take up the wire electrode; 12 a pinch roller; 13 a wire electrode return apparatus;

14, 15, 16, and 17 form an automatic wire electrode return guide roller assembly which includes guide rollers 18, 19, 20, and 21 and motors 22, 23, 24, and 25 to rotate the guide rollers 18 to 21;

18a, 19a, 20a, and 21a are wire electrode guide grooves formed in the guide rollers 18 to 21, respectively;

18b, 19, 20b, and 21b are spiral wire electrode leading grooves communicating with the wire electrode guide grooves 18a to 21a, respectively;

18c, 19c, 20c, and 21c are cylindrical portions of the guide rollers 18 to 21, respectively;

18d, 19d, 20d, and 21d are tip portions of the guide rollers 18 to 21, respectively;

22a, 23a, 24a, are shafts of the motors 22 to 25, respectively;

26 is a rotary plate onto which the motors 22 to 25 are attached; 27 a motor to rotate the rotary plate 26; 27a a shaft of the motor 27; 28 a slide table to move the motor 27 in the direction perpendicular to the wire electrode 4; 29 a base plate onto which the slide table 28 is mounted; 30 a turn table, mounted on the slide table 28, for supporting and rotating the motor 27; 31 a wire electrode extruding bar; 32 a work piece; 32a a thin hole which is previously formed in the work piece 32 in order to insert the wire electrode therein at the start of the work; 33 a motor to move the slide table 28; 33a a shaft of the motor 33; and 34 a feed screw.

The guide rollers 7 and current supply rollers 10 are movable in the lateral direction in the drawings, respectively, and can provide a constant space and/or angle to the turned-back double wire electrodes 4. In addition, as shown in the drawings, the rollers 7 and 10 can sandwich the doubled wire electrodes 4 so as to come into contact with each other.

As well as the wire electrode supply reel 5, guide rollers 6, brake roller 8, pinch roller 9, current supply rollers 10, capstan 11, and pinch roller 12 which are shown in the drawings, a wire electrode collecting reel, a working fluid supply apparatus, a current supply circuit, various kinds of control units, and the like which are not shown in the drawings are also provided on the first arm or working head 2. Similarly, in addition to the guide rollers 7 and wire electrode return apparatus 13, a working fluid supply apparatus, a current supply circuit, various kinds of control units, and the like are also provided on the second arm or working head 3. Although not shown, on the other hand, the work piece 32 can be fed in the X-Y directions by a well-known cross table provided in a working chamber.

In the state shown in FIG. 1, the wire electrode 4 is fed from the supply reel 5 and passes through the brake roller 8, current supply rollers 10, and guide rollers 7 and reaches the guide roller 18. The wire electrode is turned back by the guide roller 18 and again passes through the guide rollers 7, current supply rollers 10, and capstan 12 and is taken up on a collecting reel (not shown) which is disposed in the right ward direction in the drawings.

The work piece 32 is fed by a well-known numerical control unit. A well-known working fluid and a voltage pulse are supplied between the wire electrodes 4 and the work piece 32 and the wire-cut electric discharge machining is performed. However, since the foregoing points are similar to the well-known techniques, further description is omitted here. The treatment of the electrode will now be described hereinbelow.

The wire electrode extruding bar 31 is vertically movably supported by a control unit (not shown). The portion of the electrode extruding bar 31 adapted to come into contact with the wire electrode 4 is formed with a semi-circular shape.

When the work piece is attached, as by a broken indicated line in FIG. 3, the electrode extruding bar 31 is pulled upwardly and the wire electrode is located at a position 4' indicated by the broken line in the drawings. Further, the current supply rollers 10 and guide rollers 7 are respectively away from each other so that the electrode extruding bar 31 can pass. The pinch roller 9 is also remote from the brake roller 8.

As shown in FIG. 3, when the wire electrode 4 pulled out of the supply roller 5 passes through the brake roller 8 and guide rollers 6 and through the pinch roller 11 and capstan 12 as indicated by the broken line and is wound around a wire electrode collecting reel (not shown), the electrode extruding bar 31 starts moving downwardly to depress the wire electrode 4 to the position of the guide roller 18.

Namely, the electrode extruding bar 31 bends the wire electrode 4, while further descending after passing through the pair of current supply rollers 10. Then, the electrode extruding bar 31 passes through the thin hole 32a in the work piece 32 and through the guide rollers 7, thereby depressing the wire electrode 4 downwardly.

When the semi-circular tip portion of the electrode extruding bar 31 descends to the position which faces the outer peripheral surface of the cylindrical portion 18c of the guide roller 18, the electrode extruding bar 31 stops.

Thereafter, the electrode extruding bar 31 is slightly lifted up and a small loop of the wire electrode 4 is formed in the tip portion of the electrode extruding bar 31.

At the same time, the slide table 28 on which the motor 27 is mounted starts moving in the direction of the electrode extruding bar 31 and the motor 22 is made operative, so that the guide roller 18 rotates around its central axis.

As shown in detail in FIG. 2, the guide roller 18 is constituted by: the cylindrical portion 18c in which the wire electrode guide groove 18a is formed along the crossing line between the outer peripheral surface and a plane normal to one axis; a conical portion which is integrally provided adjacent to the cylindrical portion 18c and in which the spiral wire electrode leading groove 18b communicating with the guide groove 18a is formed in the outer peripheral surface from the top; and the elongated cylindrical tip portion 18d.

Each of the other guide rollers 19 to 21 is also constituted similarly to the guide roller 18 except that the diameters of the wire electrode guide grooves 19a, 20a, and 21a differ, respectively.

When the slide table 28 moves, the tip portion 18d of the guide roller 18 enters the loop which formed by the wire electrode 4 at the tip portion of the electrode extruding bar 31.

In association with the movement of the guide roller 18 in the direction of the electrode extruding bar 31 and the rotation of the guide roller 18 which are subsequently performed, the wire electrode 4 is wound into the spiral wire electrode leading groove 18b formed in the guide roller 18. Then, the wire electrode passes through the groove 18b and is led into the guide groove 18a.

After the wire electrode 4 has been inserted into the guide groove 18a and wound around the guide roller 18 at that position, the electrode extruding bar 31 is lifted up and the setting operation of the wire electrode 4 is completed.

In the case of the ordinary machining, the rollers 10 and 7 respectively move toward the wire electrode 4. The doubled wire electrode segments which were turned back by the guide roller 18 are come into contact with each other as shown in FIG. 1 or closely arranged at a predetermined distance as shown in FIG. 5.

Namely, the wire electrode 4 is fed from the supply reel 5 and passes through the guide roller 6 and current supply rollers 10 and penetrates through the work piece 32. Then, the wire electrode passes through the guide rollers 7 arranged on the side of the second arm or working head 3 and is wound around the guide roller 18 is turned back and passes through the guide rollers 7 and work piece 32. This wire electrode then passes through the guide rollers 6, capstan 11, and pinch roller 12 and is collected by a wire electrode collecting roller (not shown) arranged on the side of the first arm or working head 2.

In the case where the distances between the guide rollers 7 and the current supply rollers 10 are adjusted to set the distance between the doubled and reciprocating electrodes 4 to a predetermined value, it is desirable that a proper contact pressure acts on the portions between the guide rollers 7 and the wire electrode 4 and, in particular, proper plastic deformation are applied to the wire electrode 4 at the contact portions with the guide rollers 7. However, if the diameter of the cylindrical portion 18c of the guide roller 18 is fixed, the contact pressure and plastic deformation amounts remarkably vary in dependence on the distance between the doubled and reciprocating wire electrodes. Therefore, it is necessary to use the guide roller having a proper diameter of cylindrical portion corresponding to a distance.

For this purpose, according to this embodiment, a plurality of guide rollers 18 to 21 having different diameters of their cylindrical portions are prepared respectively. These guide rollers are attached to the output shafts of the motors 22 to 25 mounted on the rotary plate 26, respectively. By rotating the rotary plate 26 by the motor 27, the guide roller having the wire electrode guide groove of desired radius of curvature can be selected and used at any time.

Namely, in the case of working with a narrow gap between the doubled and reciprocating wire electrode segments, the guide roller 21 having the wire electrode guide groove of a small diameter is selected as shown in FIG. 5. In the case of working with the wide distance held, the guide roller 18 having the guide groove 18a of a large diameter is selected as shown in FIG. 5.

When the turned-back and doubled wire electrode segments are suspended so that the distance therebetween becomes slightly wider or narrower, one or both of the current supply rollers 10 and guide rollers 7 are moved, thereby adjusting the distance.

Further, in accordance with the shape of machining line, the turned-back wire electrode 4 can be also worked in the state in which they are crossed in the working portion of the work piece 32.

In this case, as shown in FIG. 6, after the wire electrode 4 was wound around the guide groove of the guide roller by the electrode extruding bar 31, the turntable 30 onto which the motor 27 to rotate the rotary plate 26 is mounted is rotated by 180° and at the same time, the positions of the rollers 10 and 7 are moved to adjust the position of the crossing point.

By selecting the guide roller by rotating the rotary plate 26, the crossing point of the wire electrode segments can be set to an upper or lower position of the working portion of the work piece 32. Further, in the crossing state of the wire electrode segments, by moving the rollers 10 and 7 to the right or left in the drawings, respectively, the wire electrode segments can be crossed at a desired position other than the working portion of the work piece 32.

Although not shown, the work can be also performed in the state in which one of the forward and backward paths of the wire electrode 4 is set to be perpendicular to the main plane of the work piece 32 and the other is inclined with respect to this plane.

Therefore, in the case of working with a fixed distance held between the doubled wire electrode segments, the distance between the doubled wire electrode segments can be easily set to a predetermined value for a short time. On the other hand, in the case of crossing the wire electrode segments in the working portion of the work piece 32, their mutual positions can be freely set. However, in these cases, the optimum guide roller can be always selected and used in accordance with the positional relation between the doubled and reciprocating wire electrodes 4, so that even if a complicated shape is worked, the work can be easily executed with a high degree of accuracy.

In this embodiment, a plurality of guide rollers having the guide grooves of different diameters and the motors were attached to the rotary plate, and a desired guide roller was selected by rotating the rotary plate by the motor. However, the rotational driving apparatus is not limited to the motor but other well-known driving apparatuses can be used. In addition, although four sets of guide rollers and motors were attached to the rotary plate, this number can be properly increased or decreased in accordance with the apparatus. Further, the guide apparatus of the wire electrode 4 was constituted by the current supply rollers 10 and guide rollers 7. However, in place of them, the well-known guide dies, boat-shaped guides, or the like can be also used. Moreover, although the guide mechanism was constituted so as to be attached to the slide table and turn table, this constitution is not limited to it but the other well-known moving mechanism can be used. In addition, although each guide roller was directly attached to the shaft of each motor, it may be attached through the gear or the like or it is also recommended to constitute such that the rotating speed of the guide roller can be controlled.

Even in the case of working by the doubled and reciprocating wire electrodes as mentioned above, a strong tension needs to be applied to the wire electrodes in the working portion and thereby to rectilinearly suspend the wire segments. However, in this case, the wire electrode passes through the working portion twice, so that the abrasion of the surface of the electrode is large and the tensile strength and the like also decrease. Therefore, to avoid accidents such as cutting and the like of the electrode, the tension of the electrode needs to be further strictly controlled as compared with the ordinary use.

However, it is difficult to keep constant the tension of the wire electrode because of the friction of the rollers to specify the turning point of the wire electrode and other electrode guides, friction of the electrodes themselves, change in brake force of the brake roller, or the like. Consequently, there is danger that the electrode is cut or the working accuracy deteriorates. In particular, these problems are serious in large-sized apparatus. Because of these reasons and other circumstances, the foregoing embodiment is not always optimum for the huge machine for a large-sized work piece.

To avoid this problem, in particular, on a huge machine for large-sized work pieces, it is recommended to constitute it in a manner as will be explained hereinbelow.

In FIGS. 7 and 8, reference numeral 41 denotes a working chamber; 42 a mounting plate disposed in the working chamber; 43 a work piece fixed onto the mounting plate 42 by clamping or the like; 44 1 wire electrode; 45 a casing in which the wire electrode supply and collecting apparatuses are enclosed; 46 a driving mechanism to relatively feed the wire electrode 44 and work piece 43 by moving the casing 45 in the X-Y directions in the drawings; 47 a wire electrode return mechanism; 48 a driving mechanism to move the return mechanism 47 in the X-Y directions in the drawings in correspondence to the movement of the casing 45; 50 a supporting frame of the casing 45; 51 a wire electrode supply drum; 52 brake rollers; 53 guide rollers; 54 current supply pins; 55 an electrode positioning guide; 56 a capstan; 57 a pinch roller; and 58 an electrode take-up drum. In the driving mechanism 46, reference numeral 60 denotes guide rails provided on the upper sides of the working chamber 41; 61 indicates frames which are moved along the guide rails 60 in the direction of a Y axis in the drawings; 62 a motor, arranged on the side wall of the working chamber 41, for feeding the frames 61 in the direction of the Y axis; 63 a guide rail, arranged between the frames 61, for slidably supporting the supporting frame 50 of the casing 45 in the direction of an X axis; 64 a feed screw which is arranged between the frames 61 and screwed into the female screw portion formed in the supporting frame 50; and 65 a motor to move the casing 45 in the direction of the X axis in the drawings by rotating the feed screw 64.

In FIG. 8 showing enlargely the wire electrode return mechanism 45, numeral 70 denotes a return roller serving as an electrode guide to specify the turning point of the wire electrode 44; 71 a holder to rotatably holding the return roller 70; 72 pressing rollers to allow the doubled and reciprocating wire electrodes 44 to be come into contact with each other; 73 arms which are axially rotatably supported by the holder 71 in order to hold the pressing rollers 72; 74 tension springs (one of the springs cannot be seen because it is hidden in the drawings), arranged between the arms 73 and the holder 71, for applying spring forces so that the pressing rollers 72 are come into contact with each other; 75a dead weight which is detachably attached by screws 77 to rods 76 attached to the lower surface of the holder 71; 78 a guide block which is moved along a guide rail 83 in the direction of the X axis by a feed screw 84, which will be explained hereinafter, and 79 a pin which is vertically fixed on the upper surface of the guide block and inserted into a hole 75a formed at the center of the dead weight 75 and serves to prevent the lateral swing of the dead weight by supporting the dead weight so as to be movable in only the vertical direction.

Further, in the driving mechanism 48 to move the return mechanism 47 in the directions of the X and Y axes in the drawings, reference numeral 80 denotes guide rails provided on the bottom surface of the working chamber 41; 81 is a frame which is moved along the guide rails 80 in the direction of the Y axis in the drawings; 82 a motor, fixed in the working chamber, for screw-feeding the frame 81 in the direction of the Y axis; 83 the guide rail, attached on the frame 81, for slidably supporting the guide block 78 in the direction of the X axis in the drawings; 84 the feed screw which is screwed into the female screw portion formed in the guide block 78; and 85 a motor to move the guide block 78 in the direction of the X axis by rotating the feed screw 84.

A power source apparatus to apply a voltage pulse for the electric discharge machining between the wire electrode 44 and the work piece 43 through the current supply pins 54, a working fluid exhaust nozzle to feet the working fluid to the working portion, and further a numerical control unit to control the motors 62, 65, 82, 85, and the like and thereby to perform the working feed in the directions of the X and Y axes between the wire electrode and the work piece, and the like are omitted in the drawings.

The wire electrode 44 is pulled out of the wire electrode supply drum 51 by rotating the capstan 56. This wire electrode passes through the brake rollers 52, guide rollers 53, current supply pins 54, electrode positioning guide 55, and the like and is let to the working portion which faces the work piece 43 across a narrow working gap. After the wire electrode passed through the working portion, it is turned back by the return roller 70 and again passes through the working portion. Thereafter, the electrode is fed through the guide 55, pins 54, guide rollers 53, capstan 56, and pinch roller 57 and then collected by the electrode take-up drum 58. During this path, the wire electrode is continuously or intermittently slowly moved.

At this time, the voltage pulse for the electric discharge machining is applied between the wire electrode 44 and work piece 43 through the pins 54 from the power source apparatus (not shown in the drawings) and the electric discharge is performed. The water and other working fluid are supplied to the working portion through the working fluid exhaust nozzle (not shown in the drawings). The work is performed by the spark erosion which is caused at this time.

By controlling the motors 62 and 65 of the driving mechanism 46 by use of the numerical control unit (not shown in the drawings), the working feed of the wire electrode 44 and work piece 43 is performed in the following manner. Namely, the casing 45 in which the wire electrode supply and collecting apparatuses consisting of various kinds of component elements from the wire electrode supply drum 51 to the take-up drum 58 are enclosed is moved in the X-Y directions in the drawings. Synchronously with the movement of the casing 45, the operations of the motors 82 and 85 of the driving mechanism 48 are controlled, thereby moving the guide block 78 in the X-Y directions. In this way, the electrode return roller 70 is moved.

If the moving directions and the movement amounts of the casing 45 and guide block 78 are completely coincident, the wire electrode 4 can be fed vertically. However, if they are individually moved, the work can be executed in the state in which the wire electrode is inclined by a desired angle, so that the taper work and the like can be executed.

The tensions of the doubled and reciprocating wire electrode segments suspended in the working portion are unconditionally determined by all of the weights of the return roller (electrode guide) 70 to specify the turning point of the wire electrode, holder 71, dead weight 75 attached thereto, and the like.

Namely, as shown in FIG. 8, the hole 75a is formed in the central portion of the dead weight 75 attached to the holder 71 of the return roller 70 through the rods 76. The lateral swing preventing pin 79 attached to the guide block 78 is slidably inserted into the hole 75a.

Therefore, the dead weight 75 is moved in the directions of the X and Y axes so as to be synchronized with and follow the movement of the guide block to the working feed. At the same time, the dead weight 75 can be freely vertically elevated along the pin 79. Thus, the lateral swing of the dead weight is prevented.

Consequently, all of the weights of the dead weight 75, holder 71, and the like are applied to the wire electrode 44. The tensions of the wire electrodes are unconditionally determined by those weights, so that the tensions can be always held constant during the working period of time.

If a copper alloy wire having a diameter of, for example, about 0.2 to 0.3 mm is used as the wire electrode, it is suitable to set all the weights of the dead weight and the like to about 3 to 5 kg.

In the case of changing tensions in accordance with the diameter and the other characteristics of the wire electrode to be used or with the working condition, it is sufficient to remove the screws 77 and to exchange the dead weight 75 to another dead weight having different weight.

The pressing rollers 72 rotatably attached to the tips of the arms 73 are urged to be come into contact with each other by the actions of the tension springs 74, thereby allowing the doubled and reciprocating wire electrodes in the working portion to be come into contact with each other.

FIG. 9 shows an embodiment in which a linear motor is used in place of the ordinary motors 62, 65, 82, and 85 as a driving source of the driving mechanism 46 of the casing 45 and of the driving mechanism 48 46 of the casing 45 and of the driving mechanism 48 of the guide block 78. In FIG. 9, the same component elements as those shown in FIG. 7 are designated by the same reference numerals. Further, numeral 66 denotes a primary side stator of the linear motor attached to the side wall of the working chamber 41; 67 is a secondary side moving member which is fixed to the frame 61 adapted to be movable in the direction of the Y axis and which is arranged near the stator 66; 68 a primary side movable member which is moved in the direction of the X axis using the guide rail 63 as the secondary side reaction rail; 86 a primary side stator of the linear motor attached to the working chamber 41; 87 a secondary side movable member which is fixed to the frame 81 adapted to be movable in the direction of the Y axis and which is arranged near the stator 86; and 88 a primary side stator attached to the frame 81. The guide block 78 adapted to be moved along the guide rail 83 in the direction of the X axis functions as the secondary side movable member for the primary side stator 88.

The casing 45 can be moved in a desired direction in the X-Y plane by controlling a driving current to the primary side stator 66 of the linear motor for movement in the direction of the Y axis by the driving mechanism 46 and a driving current to the primary side movable member 68 of the linear motor for movement in the direction of the X axis. In addition, the guide block 78 can be moved in a desired direction in the X-Y plane by controlling a driving current to the primary side stator 86 of the linear motor for movement in the direction of the Y axis by the driving mechanism 48 and a driving current to the primary side stator 88 of the linear motor for movement in the direction of the X axis. Thus, the wire electrode 44 is fed to the work piece 43.

The function of the wire electrode return mechanism 47 shown in FIG. 9 is similar to that shown in FIGS. 7 and 8. The lateral swing of the dead weight 75 is prevented by the pin 79 and at the same time, the dead weight is freely vertically movable. Therefore, the tensions of the wire electrode segments are unconditionally determined by the weights of the dead weight and the like and always held constant during the working period of time.

In order to prevent removal of the electrode return mechanism 47 from the pin 79 or its contact with the guide block 78, a sensor to detect the vertical position of the return mechanism 47 may be provided. It is also recommended that the brake forces of the brake rollers 52 are automatically adjusted on the basis of the output signal from the sensor, thereby maintaining the position of the electrode return mechanism 47 to a constant height range. In the embodiment shown, on the other hand, the work piece was fixed and the wire electrode was moved in the X/Y directions in order to realize the working feed. However, on the contrary, the wire electrode may be held at a fixed position and the work piece may be also moved. In this case, in place of the driving mechanisms 46 and 48, the work piece 43 is mounted on a cross slide table or the like which can move the work piece 43 in the X-Y directions and worked. Further, the means and method for attaching the dead weight to the electrode return roller and the lateral swing preventing mechanism are not limited to the foregoing embodiment, but various forms can be used.

In the embodiment, the tensions were applied to the doubled and reciprocating wire electrode segments by the common tension applying apparatus. However, in the case of the wire electrode segments in the backward path, a number of scratches are caused due to the electric discharge and its material also deteriorates and the entire strength also decreases and the electrode is fragile because it is turned back by the guide roller, so that the electrode may be cut in the backward path. Therefore, there is the problem that the work must be interrupted each time and the wire electrode must be supplied along a predetermined electrode supply path. Thus, upon feeding of the wire electrode, the tension which is applied to the wire electrode needs to be changed in accordance with the forward and backward paths.

For this purpose, it is recommended that the work is performed while respectively applying optimum tensions in each reciprocating wire electrode segments irrespective in the tension of the other segment, thereby making it possible to stably execute the work for a long time without causing any work interruption and the like.

The above object is accomplished by providing an apparatus which can apply the optimum tension to each segment of the reciprocating wire electrode irrespective of the tension in the other segment.

An explanation will now be explained hereinafter with reference to FIGS. 1 and 2 again.

Although not clarified in the foregoing description in particular, during the electric discharge machining, the electrode return roller 18 is not driven by the motor 22 but is freely rotatable in association with the movement of the wire electrode 4.

Therefore, although the tensions of the doubled and reciprocating wire electrode are slightly influenced by the rotational resistance of the electrode return roller 18 and by the plastic deformation which is produced when the wire electrode is turned back, this influence is very small and the tensions can be considered to be substantially identical.

On the other hand, between the doubled and reciprocating wire electrode segments, the hardness of the wire electrode 4 in the forward segment is reduced by the discharge. However, after the wire electrode passed through the working portion, considerable strength is also maintained.

Although the hardness again increases when the wire electrode 4 is turned back by the guide roller 18, the surface of the wire electrode 4 in the backward segment is largely damaged by the discharge in the forward segment and the hardness is weakened by the next discharge in the backward segment, so that the wire electrode in the backward segment is fragile.

Thus, the proper tensions need to be applied to the wire electrode segments in the forward and backward paths, respectively.

For this purpose, it is recommended that the motor 22 is made operative together with the capstan 11 during the machining, the electrode return guide roller 15 is rotated at a constant torque, and thereby providing the function as a capstan to the roller 15.

In this case, during the machining, not only the tension which is applied by the brake roller 9 and capstan 11 but also the tension by the rotation of the guide roller 18 are applied to the wire electrode 4 in the forward path, so that a strong tension is applied. On the contrary, however, the tension which is derived by subtracting the tension which is given by the rotation of the guide roller 15 from the tension which is given by the brake roller 9 and capstan 11 is applied to the electrode through the guide roller 18.

Thus, by applying the proper tension to the wire electrode 4 by the guide roller 18, the optimum tensions can be applied to the wire electrode segments in the forward and backward paths, respectively.

As a method of applying the tensions to the wire electrode segments, in addition to the foregoing guide roller, other well-known methods can be used.

A structure and an outline of the functions of a wire-cut electric discharge machine to which the current supply apparatus suitable to embody the present invention is attached will now be described with reference to FIGS. 14 and 15.

During the machining, the work is performed by the doubled and reciprocating wire electrode segment which were turned back between the first and second arms or working heads as mentioned above. The current supply apparatus, which will be explained hereinbelow, can be used to supply the current to the doubled wire electrode segments.

A constitution of the current supply apparatus will now be described hereinbelow with reference to FIGS. 10 to 13.

In FIGS. 10 to 13, A and B denote the pair of roller mechanisms which face each other so as to sandwich the wire electrodes 504 during the machining. Reference numerals 101 and 101' denote current supply rollers in which at least the outer peripheral portions are made of a conductive material having certain abrasion resistance such as, for example, what is called sintered hard alloy, Cu—W, alloy, Ag—W alloy, or other alloy of the Cu or Ag system, or the like and double guide grooves 101a and double guide grooves 101a' are formed in the outer peripheral surfaces, respectively. Numerals 102 and 102' denote shafts for rotatably support the rollers 101 and 101' through supporting mechanisms (not shown), respectively; 103 and 103' supporting frames for movably supporting the shafts 102 and 102' within constant ranges in the directions perpendicular to the directions of their central axes, respectively; 104 and 104' washers; 105 and 105' shaft supporting plates rigidly fixed to both ends of the corresponding shafts 102 and 102' respectively; 105 and 106' pins fixed to the shaft supporting plates 105 and 105', respectively; 107 and 107' pins fixed to the supporting frames 103 and 103', respectively; 108 and 108' tension springs suspended between the pins 106 and 107 and between the pins 106' and 107', respectively; 109 and 109' rotary arms in which each end is rotatably coupled with each other like a hinge and the supporting frames 103 and 103' are attached to their free ends, respectively; and 110 and 110' current supply brushes which are attached to the rotary arms 109 and supporting frames 103' and come into contact with the side surfaces of the current supply rollers 101 and 101', respectively.

As shown in FIG. 14, during the period of time until the electrode conveying apparatus 528 gradually descends and the wire electrode 504 wound around the electrode return roller 514 is hung by the electrode return apparatus 519 provided for the second arm or working head 503, the pair of rotary arms 109 and 109' coupled like a hinge are opened and the pair of roller mechanisms A and B are away from each other as shown in FIG. 12, thereby preventing the current supply apparatus from obstructing the passage of the electrode conveying apparatus 528.

After completion of the suspending work of the wire electrode, when the doubled and reciprocating electrode segments are suspended in the working portion as shown in FIG. 15, the rotary arms 109 and 109' of the current supply apparatus are rotated so that the rollers 101 and 101' face each other as shown in FIG. 11. In this way, the doubled wire electrode segments are sandwiched between the double guide grooves 101a and between the double guide grooves 101a' which are formed in the outer peripheral surfaces of the rollers, respectively.

Although not shown in the drawings, driving mechanisms of the rotary arms 109 and 109' and locking mechanisms to keep both arms in the state as shown in FIG. 11 are obviously provided.

The state during the machining with the current supplied will now be described hereinbelow with reference to FIGS. 10 and 11.

Since the roller mechanisms A and B have substantially the same constitution, the constitution of the roller mechanism A will be mainly explained here.

In order to keep a good contact state between the roller and the wire electrode, it is desirable that the radii of curvature in the cross sectional planes perpendicular to the double guide grooves 101a which are formed in the outer peripheral surfaces of the rollers 101 are completely the same as the radius of the wire electrode 504. However, if they are smaller than the electrode radius, the electrode will float from the groove, causing the contact resistance to increase. Therefore, it is recommended that those radii are set to be completely equal to or slightly larger than the radius of the electrode.

If the depths of the grooves are larger than the radius of the wire electrode, the outer peripheral surfaces of both rollers will be come into contact with each other before the wire electrodes are come into contact with the inner surfaces of the grooves, so that the wire electrodes cannot be certainly sandwiched. Therefore, it is desirable to set the depths of the grooves to be equal to or smaller than the radius of the wire electrode.

On the other hand, in order to allow the wire electrode to certainly come into contact with the rollers while the current is being supplied, it is recommended to allow the elastic forces which are directed toward the contact portions between the wire electrode and the rollers 101 and 101' to act thereon.

For this purpose, in the apparatus of the embodiment shown in the drawings, both ends of the shaft 102 of the roller are stretched toward the portion where the roller comes into contact with the wire electrode by the tension springs 108.

Namely, as shown in FIGS. 10 and 11, shaft holes 103a in the supporting frame 103 into which the shaft 102 penetrates are formed so as to be elongated along the radial direction of the roller toward the contact portion between the roller and the wire electrode. The shaft supporting plates 105 which are slidable with respect to the supporting frame 103 are rigidly inserted around the shaft 102 at both ends thereof.

Further, the pins 106 are fixed to the shaft supporting plates 105. The pins 107 are fixed to the supporting frame 103. The tension springs 108 are attached between the pins 106 and 107, respectively.

Therefore, the shaft 102 is movable in the lateral direction in FIGS. 10 and 11 for the supporting frame 103 and pulled in the direction of the contact portion between the roller and the wire electrode due to the elastic forces of the tension springs 108. Thus, the elastic forces act on the roller 101, so that the wire electrode segments are positively sandwiched between the rollers 101 and 101'. Current supply brushes 110 and 110' are in contact with the side surfaces of the rollers 101 and 101', thereby enabling the large current pulse to be stably supplied to the wire electrode 504 through the rollers 101 and 101'.

In the suspending operation of the wire electrode and at the start of the machining and the like, the opening and closing operations of the rotary arms 109 and 109' in order to allow the rollers 101 and 101' to be come into contact or removed from each other are automatically performed on the basis of the command from the control unit to control a series of operations to suspend the wire electrode.

In the embodiment shown in FIGS. 10 and 12, the rollers 101 and 101' were formed by a single member, respectively. However, for example, as shown in FIG. 13, the rollers 101 and 101' may be divided into two parts in the direction of thickness and constituted by two members 101A and by two members 101A', respectively, and at most one electrode guide groove 101a may be also formed in each of those members.

In this case, the roller members 101A and 101A' are rotatably supported by the shafts 102 and 102' independently and irrespective of the other rollers.

The other component elements are similar to those shown in FIGS. 10 to 12.

In the constitution as shown in FIG. 13, when the doubled wire electrode segments are moved in the opposite directions, the pair of roller members 101A are rotated in the opposite directions. Similarly, the roller members 101A' are also rotated in the opposite directions. Thus, each roller member can smoothly follow the movement of the wire electrode and the friction between the wire electrode and the roller is reduced.

The constructions of the current supply apparatus is not limited to the foregoing. For example, as a supporting mechanism to allow the pair of rollers to approach or be removed from each other, in addition to the foregoing hinge system, for example, the apparatus in which the roller is moved laterally or vertically or in other direction in FIG. 10 by motor, hydraulic cylinder, electromagnet, or the like can be used. On the other hand, the mechanism to allow the elastic force to act on each roller toward the contact portion with the wire electrode, the forms of the current supply brushes, the positions to attach them, and the like can be properly designed and changed as necessary.

For example, in the case where the current supply brush is a rod-like current feeding brush and the roller and shaft are integrally formed and the shaft is rotatably supported by the shaft supporting plate through the bearing, the current supply brush or current feeding brush is electrically come into contact with one end or both ends of the shaft and the current may be also supplied to the current supply rollers A and B through the shaft.

FIGS. 14 and 15 are explanatory diagram showing suspending processes of the wire electrode in a stepwise manner in an embodiment of a wire-cut electric discharge machine according to the present invention. FIGS. 16 to 18 are explanatory diagrams showing the processes, in a stepwise manner, to suspend the wire electrode to the electrode return apparatus provided for the second arm or working head by the electrode suspending apparatus provided for the first arm or working head.

In FIGS. 14 and 15, reference numeral 501 denotes the column; 502 is the first arm or working head which is arranged vertically and movably in the drawings for the column 501 so as to be projected toward the working position; 503 the second arm or working head which is arranged vertically and movably in the drawings for the column 501 so as to be projected toward the working position; 504 the wire electrode; 505 the wire electrode supply drum; 506 to 512 the guide rollers to feed the wire electrode; 513 the pinch roller which is arranged so as to be come into contact with or removed from the brake roller 511; 514 the electrode return roller; A and B the current supply rollers; 515 and 517 the wire electrode rotating apparatuses to rotate guides 515a and 517a of the die-shape, boat-shape, or the like for positioning the electrode; 519 the electrode return apparatus for supporting the electrode return roller 514 by the second arm or working head side, for turning back the wire electrode 504, and for returning the electrode to the side of the first arm or working head 502; 520 and 521 the pressing rollers; 522 the capstan; 523 the pinch roller which is arranged so as to be come into contact with or removed from the capstan 522; 524 to 526 the guide rollers to collect the wire electrode; 527 the electrode take-up drum; 528 the nest-like expandable electrode suspending apparatus; 529 the split-type working fluid exhaust nozzle; 530 the working chamber; 531 the mounting plate provided in the working chamber; 523 the cross slide table comprising the moving table 533 in the direction of the X axis, the moving table 534 in the direction of the Y axis, the drive motors 535 and 536 thereof, and the like; 537 the bed; 538 the work piece fixed on the mounting plate 531 by clamping or the like; and 539 the power source apparatus to apply the voltage pulse for the electric discharge machining between the wire electrode 504 and the work piece 538 through the current supply roller A.

FIG. 14 shows the installing step of the wire electrode 504 at the work preparing stage. In the initial stage, the wire electrode 504 pulled out of the wire electrode supply drum 505 passes through the guide rollers 506 to 511 to feed the wire electrode.

The electrode is then directly led to the capstan 522 and pinch roller 523 as indicated by the broken lines in the drawings. Subsequently, the wire electrode passes through the guide rollers 524 to 526 to collect the electrode and is collected by the electrode take-up drum 527.

At this time, the guide rollers 507 and 509 and pinch roller 513 are away from the corresponding guide rollers 506 and 508 and brake roller 511.

The pressing roller 521 is also away from the guide roller 512. The current supply rollers A and B are also away from each other. The pressing roller 520 is also displaced to the right in the drawings from the position during the machining as shown in FIG. 16.

For example, the opening/closing type guides of the die-type, boat-shape, or the like which are disclosed in Japanese patent application Nos. 194952/1983, 210374/1983, and the like may be used as the guides 515a and 517a for positioning the electrode.

The electrode rotating apparatuses 515 and 517 having the guides 515a and 517a are separated or removed to the left in the drawings. The working fluid exhaust nozzle 529 is also open. Further, the return roller 514, which is moved to the side of the electrode return apparatus 519 and is held there during the machining, is also attached to the tip of the electrode conveying apparatus 528 in the state shown in FIG. 14.

When the machining is started, the expandable telescopic electrode suspending apparatus 528 using hydraulic pressure, motor, or the like as a motive power source is gradually extended as shown in the drawings. In this case, the wire electrode 504 suspended between the brake roller 511 and the capstan 522 is engaged by the electrode return roller 514 attached to the tip of the electrode suspending apparatus 528 and pulled and extended downwardly in the drawings. At this time, the guide rollers 507 and 509 and pinch roller 513, etc. are away from the corresponding guide rollers 506 and 508 and brake roller 511, respectively. Thus, the wire electrode 504 is freely pulled out of the supply drum 505 in association with the extension of the electrode suspending apparatus 528.

A groove is formed in the outer peripheral surface of the return roller 514 in order to hold and guide the wire electrode so as not to be removed from the roller 514.

When the electrode suspending apparatus 528 is extended and the tip reaches the electrode return apparatus 519 provided in the second arm or working head 503, the return roller 514 is removed from the tip of the electrode suspending apparatus and caught by the return apparatus 519. The states during the above operations will now be described with reference to FIGS. 16 to 18.

These drawings illustrate constructions of the tip portion of the electrode suspending apparatus 528 and the electrode return apparatus 519. In the drawings, reference numeral 528a denotes a tip rod of the telescopic electrode suspending apparatus 582; 528b is an electromagnet holder attached to the tip of the rod; 528c an iron core of the electromagnet; 528d a coil; and 528e roller attracting members (although only one of them is shown in the drawings) in each of which one end is fixed to the magnetic pole of the iron core 528c and the other end is formed with a recess portion 528e' to attract a shaft 514a of the electrode return roller 514.

Among the component elements of the electrode return apparatus 519, reference numeral 519a denotes a casing; 519b a frame which is rotatably axially supported to the casing; 519c a gear fixed to the rotary shaft of the frame so as to be rotated together with the frame; 519d an intermediate gear; 519e a worm gear which is fixed to the rotary shaft of a motor 519f and is come into engagement with the intermediate gear 519d; 515g an electromagnet; 519h roller attracting plates (although only one of them is shown in the drawings) in each of which one end is fixed to the magnetic pole of the electromagnet 519g and the other end is formed with a recess portion 519h' to attract the shaft 514a of the electrode return roller 514; 519i an electromagnet attached to the inner side wall of the casing 519a; and 519j and iron material which is attracted by the electromagnet 519i when the frame 519b is closed, thereby preventing the frame from being opened.

As shown in FIG. 16, when the return roller 514 around which the wire electrode 504 was wound approaches the electrode return apparatus 519 in the state in which the roller 514 was attracted by the electromagnet attracting members 528e provided at the tip of the electrode suspending apparatus 528, the frame 519b of the electrode return apparatus 519 is lifted up and open so as not to obstruct the advance of the return roller 514.

When the electrode suspending apparatus 582 is further extended and the shaft 514a of the return roller 514 is inserted into the recess portion 519h' at the tip of the roller attracting plate 519h of the electrode return apparatus 519 as shown in FIG. 16, the current supply to the coil 528d of the electromagnet attached to the electrode suspending apparatus is stopped. In place of the stop of the current supply, the current is supplied to the electromagnet 519g on the side of the electrode return apparatus 519, thereby allowing the shaft 514a of the roller 514 to be attracted by the roller attracting plates 519h of the electromagnet 519g.

Therefore, when the electrode suspending apparatus 528 is contracted at this time, the return roller 514 is removed from the roller attracting members 528e of the suspending apparatus 528 and remained in the state in which the roller 514 is attracted by the roller attracting plate 519h on the side of the electrode return apparatus 519.

Next, the motor 519f is made operative, the frame 519b is closed as shown in FIG. 18, and the current is supplied to the electromagnet 519i, thereby allowing the iron material 519j provided for the frame to be attracted.

In this case, even if the tension is applied to the wire electrode 504, the frame 519b will be held closed, so that the return roller 514 will be held on the side of the electrode return apparatus 519.

As described above, when the return roller 514 is moved to the side of the electrode return apparatus 519 provided for the second arm or working head 503 and is held there, the wire electrode 504 is suspended in a U-shape so as to be doubled and from two segments reciprocating between the first and second arms or working heads 502 and 503.

Thereafter, as shown in FIG. 15, the electrode suspending apparatus 528 is completely contracted and the pressing rollers 520 and 521 are then moved to the left in the drawings, thereby allowing the wire electrode segments which are reciprocating between the first and second arms or working heads to approach and come into contact with each other. At the same time, the guide rollers 507 and 509 and pinch roller 513 come into contact with the corresponding guide rollers 506 and 508 and brake roller 511. The current supply roller B is also moved to the left and comes into contact with the other current supply roller A. Further, the electrode rotating apparatuses 515 and 517 are moved to the right in the drawings. Thus, the wire electrode is held at the fixed position by the electrode positioning guides 515a and 517a which are respectively provided for the electrode rotating apparatuses. In this state, by rotating the capstan 522, the wire electrode is slowly moved.

Next, the working fluid exhaust nozzle 529 is closed and the supply of the working fluid is started. The power source apparatus 539 is made operative and voltage pulses are applied between the wire electrode 504 and the work piece 538. Thus, the machining can now be performed. Therefore, the motors 535 and 536 of the cross slide table 532 are driven on the basis of the commands from the numerical control unit (not shown in the drawings), thereby feeding the work piece while keeping a predetermined working gap between the wire electrode 504 and the work piece 538. Thus, the work piece is machined to a desired shape.

The wire electrode rotating apparatuses 515 and 517 may be the same as apparatuses which will be explained hereinafter with reference to FIGS. 24 to 26.

Another wire-cut electric discharge machine different from the foregoing apparatus will now be described with reference to FIG. 19.

In this apparatus, a plurality of wire electrode reels are used and a plurality of wire electrodes pulled out of the plurality of reels pass through the common working place for the machining. For simplicity of the drawings, even in this type of wire-cut electric discharge machine, a part of or all of the plurality of wire electrodes can be used as the doubled and reciprocating type although not shown in the drawings.

In FIG. 19, reference numeral 601 denotes a column; 602 is a first arm or working head which is arranged vertically movably in the drawings for the column 601 so as to be projected toward the working place; 603 a second arm or working head arranged vertically movably in the drawings for the column 61 so as to be projected toward the working position; 604 a cutting wire electrode; 605 a finishing wire electrode; 606 a cutting wire electrode supply drum; 607 a finishing wire electrode supply drum; 608 to 613 guide rollers to guide the wire electrodes 604 and 605 such that the cutting wire electrode 604 and finishing wire electrode 605 are not come into contact with each other (excluding the case where their surfaces are not insulated); 614 a brake roller; 615 to 618 guide rollers to collect the wire electrodes which are similar to the guide rollers 608 to 613; 619 a current supply roller to supply a working voltage pulse to the cutting wire electrode 604; 620 a current supply roller to supply a finishing voltage pulse to the finishing wire electrode 605; 621 a capstan; 622 a pinch roller; 623 an apparatus to rotatably support an upper wire electrode guide 624; 625 an apparatus to rotatably support a lower wire electrode guide 626; 627 a take-up drum to collect the cutting wire electrode 604; 682 a take-up drum to collect the finishing wire electrode 605; 629 a working fluid exhaust nozzle; 630 a working chamber; 631 a mounting plate provided in the working chamber 630; 632 a cross slide table comprising a moving table 633 in the direction of an X axis, a moving table 634 in the direction of a Y axis, drive motors 635 and 635 thereof, and the like; 637 a bed; 638 a work piece fixed on the mounting plate 631 by clamping or the like; and 639 and 640 power source apparatuses to apply voltage pulses for the electric discharge machining which have predetermined peak values and waveforms among the wire electrodes 604 and 605 and the work piece 638 through the current supply rollers 619 and 620, respectively.

FIG. 19 shows the state in which the cutting and finishing wire electrodes 604 and 605 were suspended. The wire electrodes 604 and 605 pulled out of the wire electrode supply drums 606 and 607 and fed through the guide rollers 608 to 613 to supply the wire electrodes. After the wire electrodes passed through the work piece 683 and the guide rollers 615 and 616 to collect the wire electrodes, they are led to the capstan 621 and pinch roller 622. Further, the wire electrodes pass through the guide rollers 617 and 618 and are collected by the cutting wire electrode take-up drum 627 and by the finishing wire electrode take-up drum 628.

Two grooves are closely formed in each of the guide rollers 608 to 613 and 616 to 618, current supply rollers 619 to 620, capstan 621, and pinch roller 622, respectively. The cutting wire electrode 604 and finishing wire electrode 605 are enclosed in the respective grooves, thereby preventing both electrodes 604 and 605, whose surfaces are not insulated in general, from coming into contact with each other.

The upper wire electrode guide 624 and the lower wire electrode guide 626 are open before the machining is started. When both wire electrodes 604 and 605 are respectively supplied to the wire electrode guides 624 and 626, these guides are closed. After the wire electrodes 604 and 605 were installed along predetermined electrode paths and suspended by the upper and lower wire electrode guides 624 and 625 through the working portion in the work piece 638, the capstan 621 is rotated and the electrodes are moved along the above paths.

At the same time, the exhaust nozzle 629 starts supplying the working fluid. The power source apparatus 639 applies the voltage pulse for the ordinary cutting work to the cutting wire electrode 604 and also applies the voltage pulse suitable for the finishing work to the finishing wire electrode 605, respectively.

The motors 635 and 636 of the cross slide table 632 are driven by the command pulses which are sent from a numerical control unit (not shown in the drawings), thereby feeding the work piece 638 so as to keep a predetermined gap between the wire electrodes 604 and 605 and the work piece 638 and to allow these electrodes to draw a desired working contour on the work piece 638.

In this case, the cutting wire electrode 604 is precedent on the working contour and the finishing wire electrode 605 follows the cutting wire electrode at a constant distance therefrom. In this spaced state, the wire electrodes are fed, thereby allowing the ordinary cutting work and the finishing work to be simultaneously performed.

Upon feeding in a numerical control manner at this time, as will be explained in detail hereinafter, the finishing wire electrode 605 is shifted by the amount which is derived by adding a proper amount commensurate with the finishing work to the tool shift amount which is given to the cutting wire electrode 604.

The positioning states of the cutting and finishing wire electrodes by the guides will now be described with reference to FIGS. 20 to 29.

FIGS. 20 to 23 are views showing an example of the construction of the wire electrode guides which are attached to the rotating apparatus shown in FIGS. 24 to 26.

Since the construction of the lower guide 626 is substantially the same as that of the upper wire electrode guide 624, only the constitution of the upper wire electrode guide 624 will be described here.

In the drawings, reference numerals 641 and 642 denote a pair of guide members in which recess portions 641a and 641b adapted to enclose the cutting and finishing wire electrodes are formed and which are rotatably coupled with each other by a hinge; 643 is a spring which is axially supported by a pin 641c formed on the guide member 641 and which allows the elastic forces to act on pins 641b and 642b formed on the guide members 641 and 642, thereby keeping the guide members 641 and 642 in the open state as shown in FIG. 20 when no external force is applied; 644 a holding frame for rotating the guide member 642 in one plane including the central axes of both wire electrodes 604 and 605 and for holding them; 645 a hydraulic cylinder th drive the holding frame 644 in the lateral direction; and 646 a pressing pin to hold the finishing wire electrode 605 inserted into the recess portion 641b at a fixed position when the finishing wire electrode 605 was sandwiched in the recess portion 641b of the guide member 641.

When the cutting and finishing wire electrodes 604 and 605 are instaled along the predetermined electrode paths prior to the machining, the guide member 642 is vertically upwardly set as shown in FIG. 20.

After the wire electrodes 604 and 605 have completely been installed, when both wire electrodes 604 and 605 are suspended in the working portion of the work piece 638, have completely been installed, when both wire electrodes 604 and 605 the wire electrodes 604 and 605 are inserted into the recess portions 641a and 641b of the guide member 641 as shown in FIG. 21.

At this time, when the holding frame 644 is moved to the right in the diagram by driving the hydraulic cylinder 645, the holding frame 644 presses the outer side surface of the guide member 642 and causes the guide member 642 to be rotated clockwise in the drawings against the elastic force of the spring 643. As shown in FIGS. 22 and 23, the recess portions 641a and 641b of the guide member 641 and recess portions 642a and 642b of the guide member 642 are finally allowed to face one another. Thus, the wire electrodes 604 and 605 are enclosed into the recess portions 641a, 641b, 642a, and 642b which face one another, respectively.

Next, as shown in FIG. 22, the pressing pin 646 is inserted into the recess portions 641b and 642b, so that the finishing wire electrode 605 is held at the fixed position in those recess portions.

At this time, since the outer side surfaces of the guide members 641 and 642 and sandwiched by both side plates of the holding frame 644, they are not opened and the wire electrodes 604 and 605 can be positively held.

Now, since the wire electrode guides 624 and 626 are attached on the supporting apparatuses 623 and 625 and used, respectively, the practical attaching states and functions of the supporting apparatuses 623 and 625 and the corresponding wire electrode guides 624 and 626 will now be described with reference to FIGS. 24 to 26.

Since the construction of the supporting apparatuses 623 and 625 are the same, only the supporting apparatus 623 provided on the side of the first arm or working head 602 will now be described.

In FIGS. 24 to 26, reference numeral 624 denotes the wire electrode guide comprising the guide members 641 and 642, holding frame 644, hydraulic cylinder 645, pressing pin 646, etc. as mentioned above.

A mounting base 647 is attached to the first arm or working head 602. Numeral 648 denotes a rotary board in which a tooth-shaped portion 648a of the worm wheel type is formed in the peripheral edge portion. A projecting portion 648b of the bottom surface of the rotary board 648 is rotatably inserted into a recess portion 647a formed in the mounting base 647. Numeral 649 indicates a pressing pin holder to support the pressing pin 646; 650 is a spring, provided in the pressing pin holder 649, for allowing the elastic force to act on the pressing pin 646 so as to outwardly displace the pin 646; 652 a supporting frame for supporting the pressing pin holder 649 so as to freely come into contact with or be removed from the guide members 641 and 642; 652 a guided supporting frame, attached to the upper surface of the rotary board 648, for slidably guiding the supporting frame 651; 653 a pinion gear which is attached to the rotary shaft of a motor 654 attached to the upper surface of the rotary board 648 and which is to come into engagement with a rack gear 651a notched in the side surface of the supporting frame 651; and 655 a worm gear which is attached to the rotary shaft of a motor 656 attached to the mounting base 647 and which is to come into engagement with the tooth-shaped portion 648a of the worm wheel type formed in the peripheral edge portion of the rotary board 648.

When the cutting wire electrode 604 and finishing wire electrode 605 are suspended along the predetermined wire electrode paths, the guide member 641 of the wire electrode guide die 624 is vertically upwardly set as shown in FIG. 20. When the pinion gear 653 adapted to move the supporting frame 651 to which the pressing pin holder 649 is attached in the lateral direction in the drawings is rotated counterclockwise in the drawings, the supporting frame 651 is moved to the right in the drawings through the rack gear 651a adapted to be come into engagement with the pinion gear 653. Thus, the pressing pin 646 is removed from the guide members 641 and 642 and moved to the rightmost positions. In this state, the cutting and finishing wire electrodes 604 and 605 are suspended.

As shown in FIG. 19, the edge portions of the wire electrodes 604 and 605 pass from the guide rollers 615 and 616 provided for the second arm or working head 603 through the portion between the capstan 621 and the pinch roller 622 and through the guide rollers 617 and 618 and are wound around the wire electrode take-up drums 627 and 628. Subsequently, the hydraulic cylinder 645 is made operative and the guide member 641 is set into the state as shown in FIGS. 22 and 23.

At the same time, the pinion gear 653 is rotated clockwise in the drawings, the supporting frame 651 is moved to the left in the drawings, the pressing pin 646 enters the recess portions 641b and 642b in the guide members 641 and 642, and the finishing wire electrode 605 is pressed by the spring 650 and held at the fixed position.

FIG. 24 shows the state in which the cutting and finishing wire electrodes 604 and 605 have completely been set in the wire electrode guide die 624 as mentioned above.

After the cutting and finishing wire electrodes 604 and 605 were rectilinearly suspended in the working portion of the work piece under the constant tensions in this manner, the ordinary working voltage pulse is applied between the cutting wire electrode 604 and the work piece 638 as described above and the finishing voltage pulse is applied between the finishing wire electrode 605 and the work piece 638. The work piece is fed while controlling the cross slide table 632 by the numerical control unit. Thus, the ordinary cutting work and finishing work can be simultaneously performed.

During the time period of the machining, the cutting wire electrode 604 is precedent on the working contour and the work piece is subjected to the wire-cut electric discharge machining in an ordinary manner. Then, the surface which has previously worked by the cutting wire electrode 604 is finished by the finishing wire electrode 605 which follows the cutting wire electrode 604.

The doubled wire electrodes 604 and 605 must always come into contact with the working contours whose machinings are assigned excluding the shifts of the well-known tools, respectively.

In conjunction with the cutting wire electrode 604, the work piece 638 is fed by an ordinary numerical control method in consideration of a desired finishing margin and a working gap, thereby allowing the ordinary contour to be worked. However, the finishing wire electrode 605 is moved along the working contour while executing the work corresponding to the finishing margin. Therefore, a rotational angle $\theta$ of the rotary board 648 needs to be controlled through the worm gear 655 attached to the rotary shaft of the motor 656.

Figure 35:
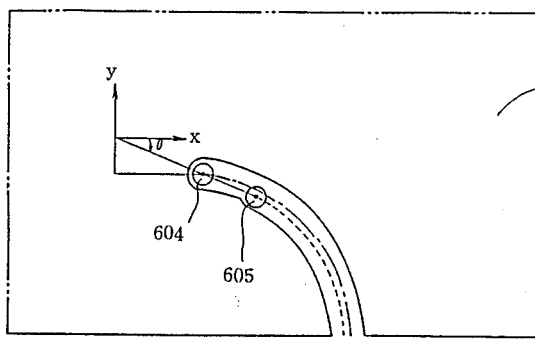

The working state when the cutting and finishing works are simultaneously performed by use of the apparatus shown in FIGS. 24 to 26 is shown in FIG. 35, which will be explained next.

By making the cutting wire electrode 604 coincident with the rotational center of the rotary board 648, even if the rotary board 648 is rotated by only the angle $\theta$, the cutting wire electrode 604 doesn't move and only the position of the finishing wire electrode 605 is changed. Therefore, the machining of the contour is not influenced by the cutting wire electrode 604. The tool shift corresponding to a proper finishing margin is given to the finishing wire electrode 605 and the electrode 605 follows the cutting wire electrode 604 and is moved along the path parallel with the moving locus.

It is sufficient to control the rotational angle $\theta$ of the rotary board 648 so that the angle between the straight line connecting the central lines of both wire electrodes and the tangential line of the working contour is always constant. Therefore, the program for this control may be fairly simple.

A construction of another wire electrode guide different from the foregoing guide will now be described hereinbelow with reference to FIGS. 27 to 29.

FIGS. 27 to 29 show the construction of another wire electrode guide different from that shown in FIGS. 20 to 23. In these drawings, reference numerals 701 and 702 denote a pair of guide members in which notched portions 701a and 702a adapted to receive the wire electrodes are formed and which are rotatably coupled with each other by a hinge 703; 704 indicates two wire electrode segments which are reciprocating in the working portion as mentioned above; 705 a holding frame which is moved in the lateral direction in the drawings and holds the guide members 701 and 702 as shown in FIG. 28 when the holding frame advances to the right; 706 hydraulic cylinder to laterally drive the holding frame 705; 707 a pressing pin which is inserted into the notched portions 701a and 702a of the guide members 701 and 702 when the wire electrode segments 704 are sandwiched in these notched portions, thereby holding the wire electrode at the fixed positions; and 708 a spring, supported by a pin 701c attached to the guide member 701, for allowing the elastic force to act between pins 701b and 702b attached to the guide members 701 and 702, thereby holding the guide members 701 and 702 in the open states as shown in FIG. 27 when no external force is applied.

In this embodiment, the guide member 701 and hydraulic cylinder 706 are attached on the member similar to the rotary board 648 shown in FIGS. 17 to 23 in a manner similar to the wire electrode guide 624 shown in these drawings.

Next, as shown in FIG. 29, by inserting the pressing pin 707 into the slit which is formed by the opposite notched portions 701a and 702a, the wire electrode segments 704 are held at the fixed positions in the slit.

At this time, since the outer side surfaces of the guide members 701 and 702 are sandwiched by arms 705a and 705b of the holding frame 705, the guide members 701 and 702 are not opened and the wire electrode segments are positively held.

On the other hand, since the tip sides of the guide members 701 and 702 are inclined and formed so as to be gradually outwardly widened, the pressing pin 707 can be easily inserted.

Although this wire electrode guide apparatus can be used similarly to the apparatus 624, in particular, it is recommended to use it as shown in FIGS. 30 to 34 and 40 to 42.

Figure 30:
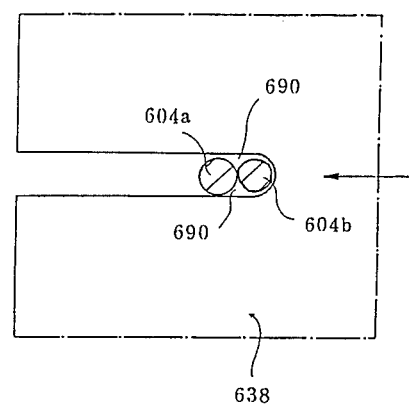
Figure 31:
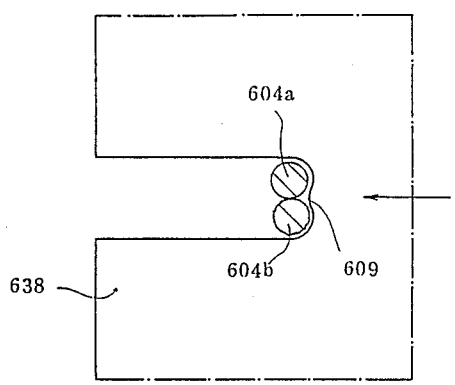

FIG. 30 relates to an example in the case where doubled and reciprocating wire electrode segments are arranged in the tangential direction of the scheduled working line and the machining is performed. This diagram illustrates the example in the case where a wire electrode segment 604b on the return side is precedent along the scheduled working line and a wire electrode segment 604a which is newly fed is allowed to follow the wire electrode segment 604b, thereby performing the finishing work. FIG. 31 shows an example in the case where doubled and reciprocating wire electrode segments are arranged on a line normal to the scheduled working line and the work piece 638 is cut.

Figure 32:
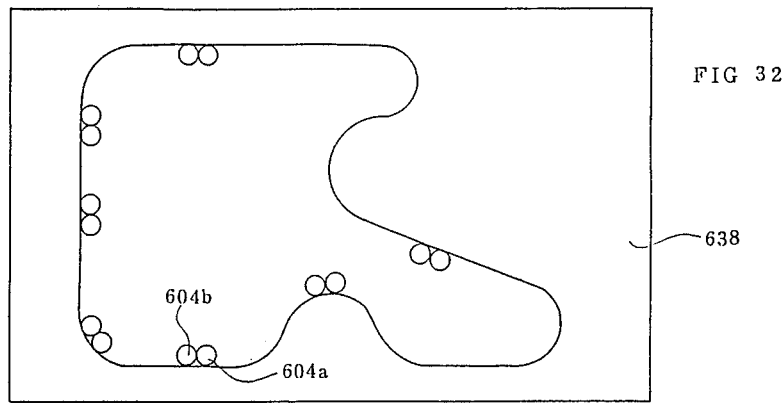

FIG. 32 shows a state in which doubled and reciprocating wire electrode segments are moved along the working contour.

Figure 33:
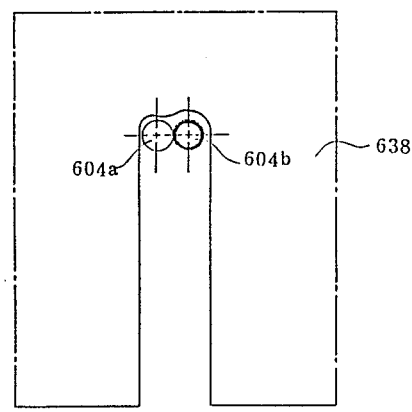
Figure 34:
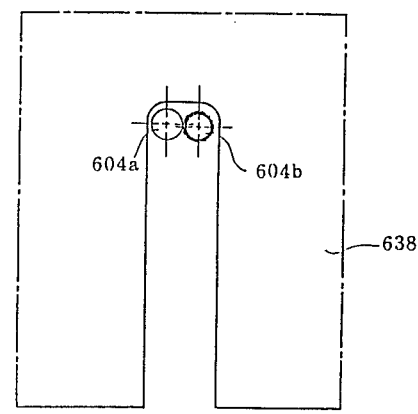

By use of the working method shown in FIG. 31, a larger working gap is produced on the side of the previously operated wire electrode segment as compared to the gap at the frontmost working portions of the fresh segment as shown in FIG. 33. Therefore, to make the gaps uniform, it is desirable that the return-side wire electrode segment 604b is offset from the supply-side wire electrode segment 604a by a short distance.

FIGS. 36 to 39 will now be described.

In FIGS. 36 to 39, numerals 605', 605", and 605''' denote finishing wire electrode segments.

Figure 36:
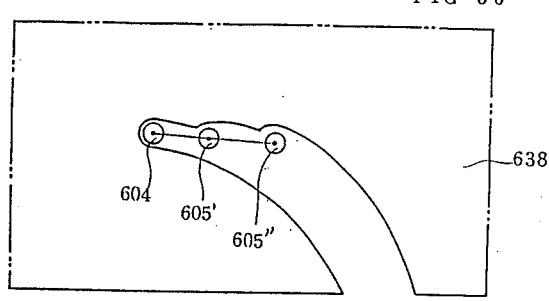

FIG. 36 shows machining with of one cutting wire electrode segment 604 and two finishing wire electrode segments 605' and 605". These three wire electrode segments have the same diameter and the machining is performed in the state in which constant spaces are maintained between the wire electrode segments.

When the ordinary cutting work is performed by the cutting wire electrode segment 604, the middle finishing work is executed by the finishing wire electrode segment 605' and the following work is carried out by the final finishing wire electrode segment 605" following the wire electrode segment 605'.

Therefore, according to this method, the ordinary cutting work, the middle finishing work, and the mirror finishing work can be simultaneously performed in parallel, so that the time required to perform all machining can be remarkably reduced.

Figure 37:
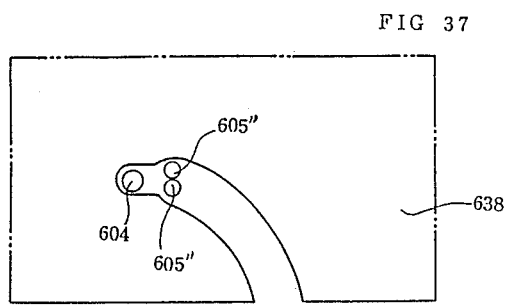

FIG. 37 shows the example in the case where the machining is performed by use of one cutting wire electrode segment 604 and two finishing wire electrode segments 605' and 605" having diameters smaller than that of the wire electrode segment 604.

With this construction, a large amount of working fluid can be supplied into the working gap by use of the spaces between the cutting wire electrode segment 604 and the finishing wire electrode segments 605' and 605". Thus, the cooling effect can be fairly enhanced and the precise machining can be efficiently performed by a larger current.

Figure 38:
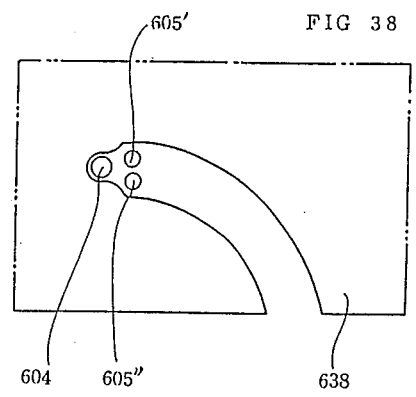

As shown in FIG. 38, if the finishing work is executed in the state in which a constant gap is held between the two finishing wire electrode segments 605' and 605" in accordance with the shape of the working contour and the like, a larger amount of working fluid can be supplied and the cooling effect can be further enhanced.

Figure 39:
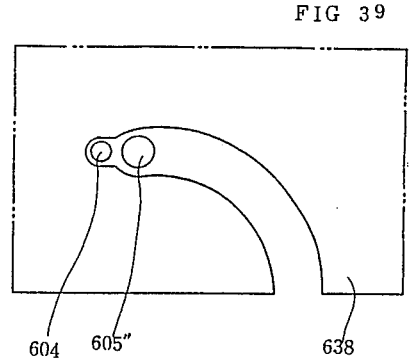

FIG. 39 shows the example in the case of machining by use of one cutting wire electrode segment 604 and one finishing wire electrode segment 605''' having a diameter larger than that of the cutting wire electrode 604. In this case as well, the working gap is enlarged and a large amount of working fluid can be supplied into the working gap, so that the cooling effect can be substantially enhanced.

In the respective operations in FIGS. 35 to 39, it is obvious that the electrical working conditions and working margins must be determined or the materials of the wire electrodes must be further selected in a manner such that the working speeds to remove predetermined margins by the finishing wire electrode segments 605, 605', 605", and 605''' are almost equal to or higher than the cutting speed by the cutting wire electrode segment 604. Further, if necessary, it is also preferable to improve the working accuracy by setting the tensions which are applied to the finishing wire electrodes to be sequentially larger than that which is applied to the electrode which was used for the work at the front stage.

By the construction mentioned above, according to the present invention, the ordinary cutting work and the finishing work of the cut surface can be simultaneously performed and a wire electrode of the optimum diameter and the optimum material can be used at each working stage. At the same time, the machining can be executed while applying the voltage pulse according to each operation, so that the work piece can be preferably efficiently performed within a short time.

The construction of the foregoing embodiments doesn't limit the scope of the invention. Namely, for example, although one cutting wire electrode segment and one or two finishing wire electrode segments were used in the embodiments, the number of these wire electrode segments can be changed in accordance with the working state.

Therefore, the cutting wire electrode segment may also be constituted by a plurality of thin wire electrode segments and the finishing wire electrode segment may be constituted by one wire electrode segment of a large diameter. Moreover, both of the cutting and finishing wire electrode segments may be a plurality of wire electrode segments of small diameters.

Figure 40:
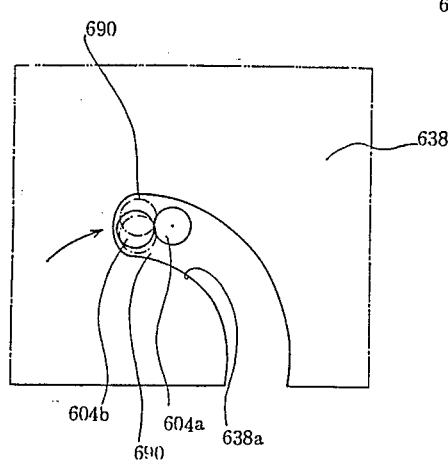
Figure 41:
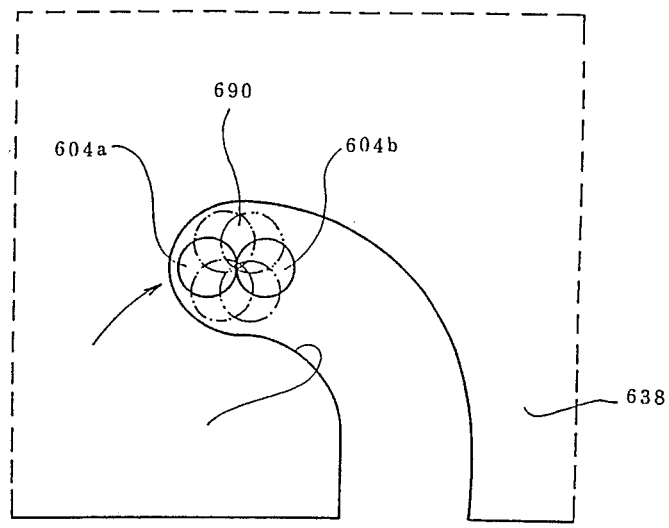
Figure 42:
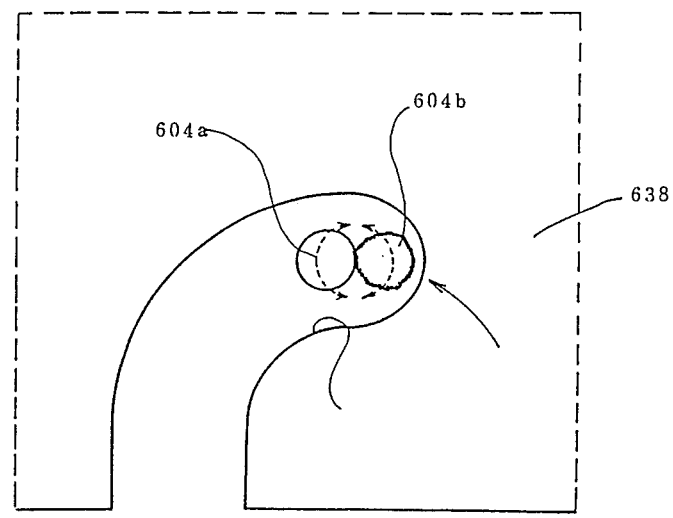

In FIGS. 40 to 42, the wire segments 604a and 604b indicated in solid lines are always arranged substantially in the work advancing direction as mentioned above.

In other words, assuming that the work piece 638 is fed in the directions indicated by arrows in the drawings, the positional relation between both wire electrode segments is controlled so that the straight line connecting the centers of both wire electrode segments coincides with the work feeding direction. However, in FIG. 40, in addition to the above control, the preceding cutting wire electrode segment 604b is allowed to perform the doubled and reciprocating swing motion around the following finishing wire electrode segment 604a as a rotational center within a small angle range which is exaggerated and shown by an alternate long and short dash line in the drawings.

Therefore, as compared with the case of working by use of one wire electrode, fairly wider working gaps 690 are formed between the work piece 638 and the wire electrode segments 604a and 604b. The amount of working fluid which is supplied into the working gap is greatly increased and the cooling effect is enhanced. Thus, the machining can be performed using a large current pulse, the working efficiency is fairly improved, the bend of the electrode by the discharge pressure decreases, and the machining can be executed with a high degree of accuracy.

In the embodiments shown in FIGS. 41 and 42, the foregoing swing motion is performed around the contact point of both wire electrode segments as a center of the motion, so that the wide working gap 690 is formed similarly to the case shown in FIG. 40.

What is claimed is:

1. A wire-cut electric discharge machine comprising:
first and second vertically spaced working heads;
supply means on said first working head for a wire electrode;
collecting means on said first working head for collecting the wire electrode;
electrode returning means on said second working head for receiving the wire electrode from said supply means and for returning the wire electrode to said collecting means, said electrode returning means forming a loop in said wire electrode to provide a first segment thereof coming from the supply means and an adjacent second segment returning to the collecting means;
means supporting a workpiece between said heads;
said workpiece having an opening through which the first and second segments extend adjacent to one another in operative position for each to machine the workpiece;
means for providing relative movement between the workpiece and the segments of the wire electrode;
power means for supplying voltage pulses to said wire electrode for effecting electric discharge machining between the workpiece and the two segments of the wire electrode; and
means for supplying a working fluid into a working gap formed between the workpiece and the two adjacent segments of the wire electrode.

2. A wire-cut electric discharge machine according to claim 1, wherein said wire electrode returning means includes a guide roller to automatically turn back and return the wire electrode, and said guide roller comprises:
a cylindrical portion in which a guide groove adapted to receive the wire electrode is formed in the outer peripheral surface;
a shaft portion for said cylindrical portion coaxially therewith;
a conical portion which is integrally formed adjacent to the cylindrical portion on the side opposite to said shaft portion and in which a spiral wire electrode leading groove communicating from the tip portion of said conical portion with said wire electrode guide groove is formed in the outer peripheral surface; and a thin cylindrical leading portion which is integrally provided adjacent to the tip portion of the conical portion.

3. A wire-cut electric discharge machine according to claim 2, wherein said wire electrode returning means comprises:
a plurality of wire electrode returning guide rollers in which outer diameters of the cylindrical portions differ from one another; and
a selecting mechanism which can arbitrarily select one of said plurality of wire electrode returning guide rollers for use with a particular work piece.

4. A wire-cut electfric discharge machine according to claim 1 comprising an electrode guide roller for turning the wire electrode ascendably and decendably supported, and a dead weight attached to said electrode guide roller in order to apply a desired tension to the wire electrode.

5. A wire-cut electric discharge machine according to claim 4, wherein said dead weight is detachably and exchangeably attached to the electrode guide roller.

6. A wire-cut electric discharge machine according to claim 4 or 5, wherein said wire electrode returning means includes a lateral swing preventing mechanism for said dead weight.

7. A wire-cut electric discharge machine according to claim 1 comprising means for applying tension to the wire electrode which includes an apparatus which can apply tension to said two segments of said wire electrode individually irrespective of the tension on the other.

8. A wire-cut electric discharge machine according to claim 7, wherein said means which applies tension to the reciprocating two segments of the wire electrode individually comprises a motor for applying a desired rotational torque to said wire electrode return means.

9. A wire-cut electric discharge machine according to claim 1 wherein said power means comprises:
a pair of conductive current supply rollers in which two guide grooves are formed in parallel with each other in the outer peripheral surfaces;
a supporting mechanism for rotatably supporting said pair of current suppoy rollers in a manner such that said two guide grooves are allowed to face each other and each of the wire electrodes can be put between said opposite grooves; and
a current supply brush adapted to be come into contact with the rotary portion including said pair of current supply rollers.

10. A wire-cut electric discharge machine according to claim 9, wherein the radius of curvature in the cross section perpendicular to each of the guide grooves formed in the current supply rollers is almost equal to a radius of said wire electrode, and a depth of each of said grooves is not larger than the radius of the wire electrode.

11. A wire-cut electric discharge machine according to claim 9 or 10, wherein the supporting mechanism of said pair of current supply rollers includes a mechanism for allowing an elastic force to act from each center of said pair of current supply rollers toward the points which come into contact with the wire electrode.

12. A wire-cut electric discharge machine according to claim 10 wherein the supporting mechanism for said pair of current supply rollers includes a mechanism for supporting the pair of current supply rollers so as to freely come into contact with or be separated from each other.

13. A wire-cut electric discharge machine according to claim 10 wherein each of said pair of rollers is divided into two parts in the direction of its thickness, and each of said two guide grooves is formed in the outer peripheral surface of each of said divided rollers.

14. A wire-cut electric discharge machine according to claim 13 wherein said wire electrode guide comprises:
a pair of guide members having notched portions adapted to hold the wire electrodes on the surfaces which face each other; and
a displacement mechanism for allowing at least one of said guide members to be relatively displaced with respect to the other guide member in a manner such that the surfaces formed with said notches are to come into contact with or be removed from each other.

15. A wire-cut electric discharge machine according to claim 14, wherein said wire electrode guide includes a pressing pin which is substantially vertically inserted into a wire electrode path formed by said notched portions and which presses the wire electrode by the tip of said pressing pin.

16. A wire-cut electric discharge machine according to claim 14 or 15, wherein said displacement mechanism of said guide members displaces at least one of the guide members in the plane which is perpendicular to the suspending direction of the wire electrode.

17. A wire-cut electric discharge machine according to claim 14 or 15, wherein said displacement mechanism of the guide members displaces at least one of the guide members in the plane which is parallel with the suspending direction of the wire electrode.

18. A wire-cut electric discharge machine as claimed in claim 1 comprising means for displacing the wire electrode to mount the wire electrode on the electrode returning means.

19. A wire-cut electric discharge machine according to claim 18 wherein said means for displacing the wire electrode comprises a push bar displaceable between said first and second heads and positioned to push the wire electrode extending from the supply means to the collecting means to displace the wire electrode towards said second head in the form of a loop with said segments extending vertically adjacent one another.

20. A wire-cut electric discharge machine as claimed in claim 19 wherein said means for displacing the wire electrode further comprises a removable roller on said push rod for engaging said electrode such that said loop is formed on said roller, and means for releasing said removable roller for attachment to said second head to form part of said electrode returning means thereon.

* * * * *